(12) United States Patent
Kitahara et al.

(10) Patent No.: US 11,617,943 B2
(45) Date of Patent: *Apr. 4, 2023

(54) INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Shinji Kitahara, Kyoto (JP); Shota Shimada, Tokyo (JP); Atsushi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,562

(22) Filed: Sep. 16, 2021

(65) Prior Publication Data

US 2022/0001271 A1    Jan. 6, 2022

Related U.S. Application Data

(63) Continuation of application No. 16/751,894, filed on Jan. 24, 2020, now Pat. No. 11,154,770.

(30) Foreign Application Priority Data

Aug. 20, 2019  (JP) .............................. JP2019-150413

(51) Int. Cl.
*A63F 13/214*    (2014.01)
*G06F 3/0346*    (2013.01)
(Continued)

(52) U.S. Cl.
CPC ............ *A63F 13/214* (2014.09); *A63F 13/24* (2014.09); *G06F 3/0346* (2013.01); *G06T 19/20* (2013.01);
(Continued)

(58) Field of Classification Search
USPC ......................................................... 463/37
See application file for complete search history.

(56) References Cited

U.S. PATENT DOCUMENTS 9,492,742 B2 * 11/2016 Hayashi ................. A63F 13/214
11,033,812 B2 * 6/2021 Niwa ...................... A63F 13/23
(Continued)

FOREIGN PATENT DOCUMENTS

| | | |
|---|---|---|
| JP | 2012-239762 | 12/2012 |
| WO | 2016/059943 | 4/2016 |

OTHER PUBLICATIONS

Office Action for JP2019-150413, dated Dec. 24, 2019 with machine translation, 12 pages.
(Continued)

*Primary Examiner* — Pierre E Elisca
(74) *Attorney, Agent, or Firm* — Nixon & Vanderhey PC

(57) ABSTRACT

Input data containing at least strain data corresponding to deformation of an input apparatus or motion data corresponding to a motion or orientation of the input apparatus, is obtained from the input apparatus. Based on the motion data, a first object is caused to move in a virtual space or an orientation of the first object in the virtual space is changed. Based on the strain data, the first object is caused to perform a predetermined action in the virtual space.

20 Claims, 19 Drawing Sheets

(51) Int. Cl.
  *G06T 19/20* (2011.01)
  *A63F 13/24* (2014.01)
  *A63F 13/211* (2014.01)
(52) U.S. Cl.
  CPC ..... *A63F 13/211* (2014.09); *G06T 2219/2016* (2013.01)

(56) References Cited

U.S. PATENT DOCUMENTS

| | | |
|---|---|---|
| 2008/0146336 A1 | 6/2008 | Feldman et al. |
| 2012/0302345 A1 | 11/2012 | Shikata et al. |
| 2017/0216670 A1 | 8/2017 | Kuroda et al. |
| 2018/0250584 A1* | 9/2018 | Obayashi ............... A63F 13/211 |
| 2019/0217185 A1* | 7/2019 | Sakaguchi ............. A63F 13/42 |
| 2019/0220089 A1* | 7/2019 | Kakizawa ............ G02B 27/017 |
| 2019/0244416 A1* | 8/2019 | Tamaoki .................. G09G 5/38 |
| 2019/0247751 A1* | 8/2019 | Tamaoki ................. A63F 13/26 |
| 2020/0320793 A1* | 10/2020 | Margolina ............ G06T 19/006 |
| 2020/0368616 A1* | 11/2020 | Delamont ............. A63F 13/213 |
| 2021/0052974 A1 | 2/2021 | Kitahara et al. |
| 2021/0060413 A1* | 3/2021 | Kurata .................. A63F 13/428 |
| 2021/0103340 A1* | 4/2021 | Bradski ................ H04N 13/279 |

OTHER PUBLICATIONS

Shuichi Matsumoto, Magical Date Doki-Doki Kokuhaku Daisakusen, Perfect Walk-Through, first edition, AXELA, Jan. 21, 1998, pp. 38 (4 pages).

* cited by examiner

FIG. 13
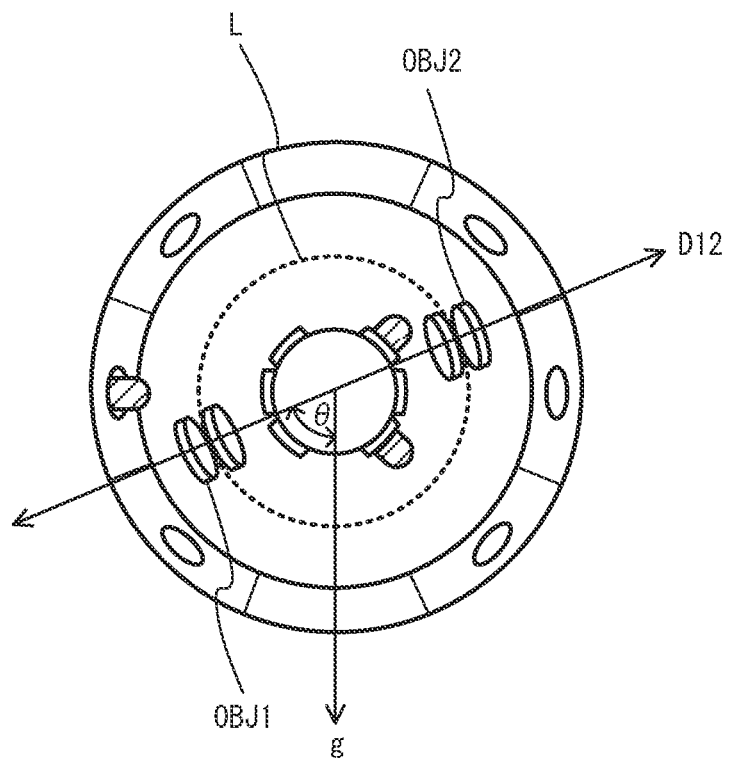
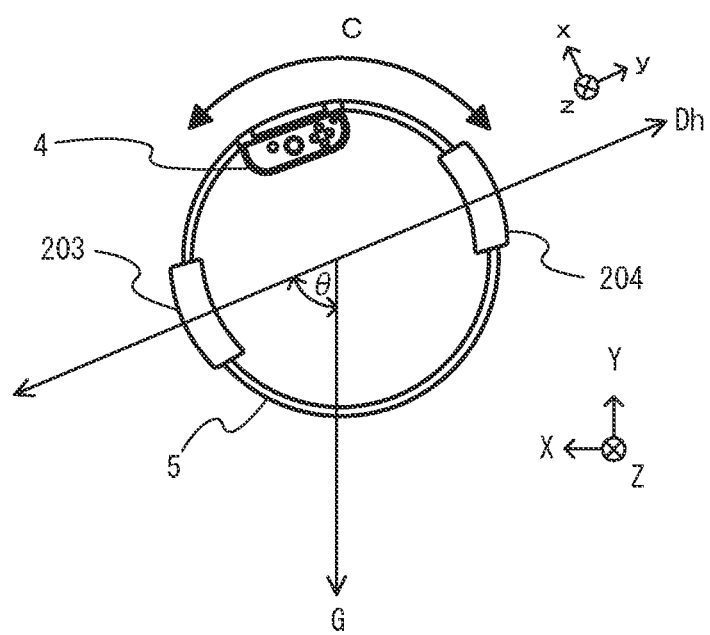

FIG. 15
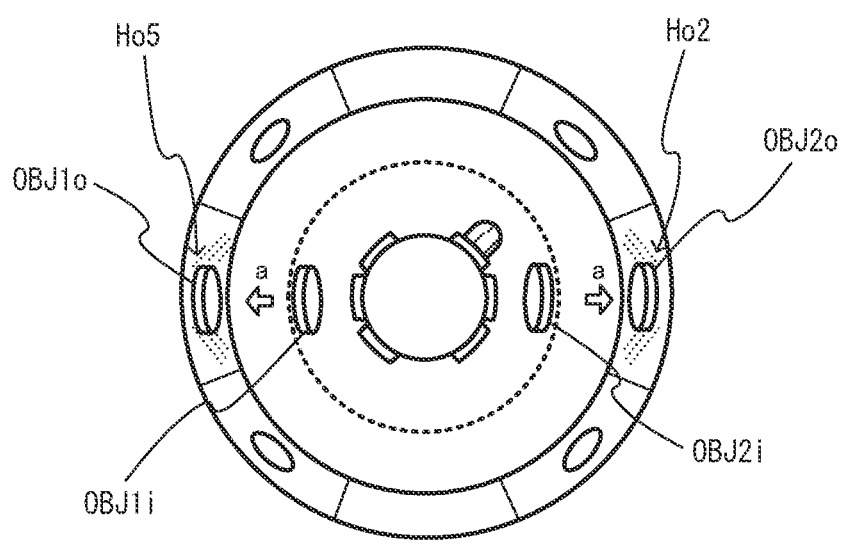
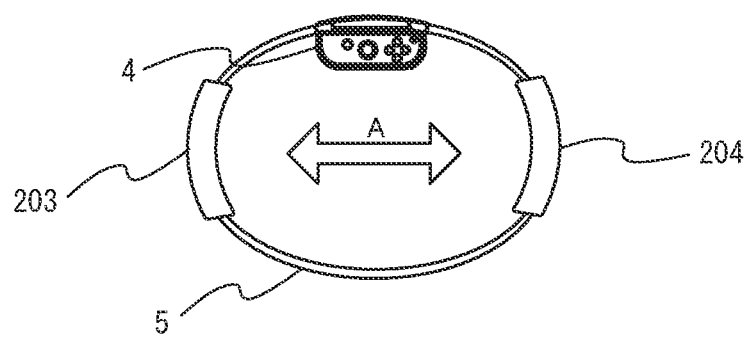

FIG. 16
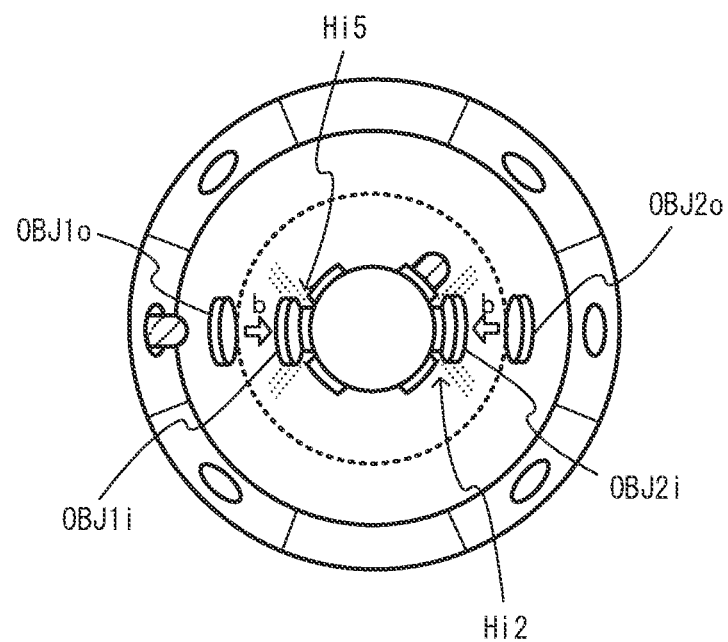
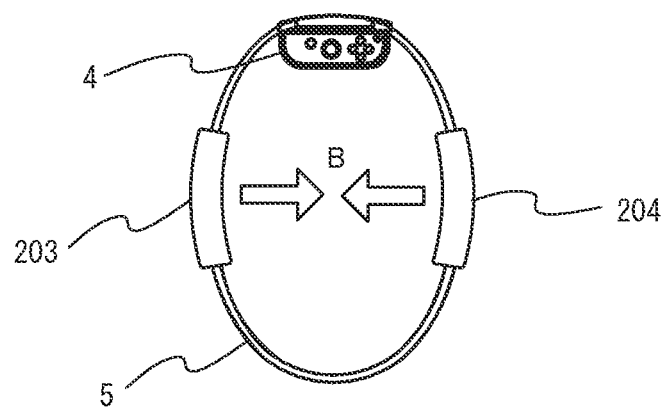

INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATION

This application is a continuation of U.S. application Ser. No. 16/751,894 filed Jan. 24, 2020, which claims priority to Japanese Patent Application No. 2019-150413 filed Aug. 20, 2019, the entire contents of each of which are hereby incorporated herein by reference.

FIELD

The technology disclosed herein relates to information processing systems, storage media storing information processing programs, information processing apparatuses, and information processing methods for causing an object to perform an action according to a user's operation.

BACKGROUND AND SUMMARY

Conventionally, an input apparatus has been disclosed that is held by a user and allows a game process to be executed using an output of the input apparatus.

However, there is room for improvement of a user's bodily sensation in a game using the above input apparatus.

With the above in mind, it is an object of this non-limiting example to provide an information processing system, storage medium storing an information processing program, information processing apparatus, and information processing method that can improve a user's bodily sensation.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

An information processing system according to this non-limiting example includes an input apparatus including a strain sensor and a motion sensor, and an information processing apparatus. The input apparatus is at least partially elastically deformable in response to an external force applied thereto. The strain sensor outputs strain data corresponding to deformation of the input apparatus. The motion sensor outputs motion data corresponding to a motion and/or orientation of the input apparatus. The information processing apparatus includes a computer that executes obtaining input data containing at least the strain data or motion data from the input apparatus, and executing a game process. The executing the game process includes moving a first object in a virtual space or changing an orientation of the first object in the virtual space, based on the motion data, and causing the first object to perform an action in the virtual space, based on the strain data.

With the above configuration, the first object can be caused to perform different actions according to an operation of moving the input apparatus and an operation of deforming the input apparatus, and therefore, the user's bodily sensation can be improved by operations performed using the input apparatus. In addition, different action controls can be performed on the first object using different operations performed on the input apparatus, and therefore, the number of kinds of actions carried out by the first object can be increased.

The executing the game process may further include calculating an orientation of the input apparatus in a real space, based on the motion data. The moving the first object or changing the orientation of the first object may further include moving the first object in the virtual space based on the orientation of the input apparatus.

With the above configuration, an action of the first object can be controlled by an operation of changing the orientation of the input apparatus.

The moving the first object or changing the orientation of the first object may further include moving the first object along a movement path set in the virtual space. The causing the first object to perform the action may further include causing the first object to perform an action of moving away from the movement path.

With the above configuration, the movement along a set movement path and the movement away from the movement path can be easily carried out separately by performing different operations on the input apparatus.

The executing the game process may further include calculating an orientation of the input apparatus in a real space based on the motion data. The moving the first object or changing the orientation of the first object may further include setting the orientation of the first object in the virtual space based on the orientation of the input apparatus. The causing the first object to perform the action may further include causing a second object or a portion of the first object to perform an action of moving from the first object in a direction based on the orientation of the first object.

With the above configuration, the movement of the first object and the movement of a second object or a portion of the first object from the first object can be easily carried out separately by performing different operations on the input apparatus.

The causing the first object to perform the action may further include causing the first object to perform an action of moving in a first direction away from the movement path when the strain data indicates that the input apparatus is deformed in a first form, and causing the first object to perform an action of moving in a second direction away from the movement path, the second direction being different from the first direction, when the strain data indicates that the input apparatus is deformed in a second form.

With the above configuration, the movement of the first object to one side of movement path and the movement of the first object to the other side can be carried out separately according to the form of deformation of the input apparatus.

The input apparatus may include at least a part of an arc-shaped portion. The movement path may include an arc-shaped path. The moving the first object or changing the orientation of the first object may further include causing the first object to move along the arc-shaped movement path based on a change in the orientation of the input apparatus caused by turning of the arc-shaped portion of the input apparatus in a circumferential direction thereof.

With the above configuration, the first object moves along the movement path similar to the shape of the input apparatus, and therefore, the movement of the first object can be controlled in an intuitive manner.

The input apparatus may include at least one holding portion on the arc-shaped portion. The moving the first object or changing the orientation of the first object may further include causing the first object to move so that the first object is disposed at a location on the arc-shaped movement path corresponding to a location of the holding portion on the arc-shaped portion.

With the above configuration, the first object is disposed at a location corresponding to the holding portion of the input apparatus, and therefore, the movement of the first object can be controlled in a more intuitive manner.

The holding portion may be disposed at a plurality of locations on the arc-shaped portion. A plurality of the first objects may be disposed in the virtual space. The moving the first object or changing the orientation of the first object may further include causing the plurality of first objects to move so that the plurality of first objects are disposed at respective corresponding locations on the arc-shaped movement path corresponding to respective locations of the plurality of holding portions on the arc-shaped portion.

With the above configuration, when a plurality of holding portions of the input apparatus are held with both hands, the plurality of first objects are disposed at locations corresponding to the plurality of holding portions, and therefore, the movement of the plurality of first objects can be controlled in an intuitive manner.

The executing the game process may further include controlling a second object in the virtual space. The causing the first object to perform the action may further include causing the first object to perform an action which gives an effect to the second object, or an action which does not give an effect to the second object, based on a positional relationship between the first and second objects in the virtual space.

With the above configuration, a game in which the first object gives an effect on a second object can be carried out.

The controlling the second object may further include performing control to cause the second object at one or more of a plurality of appearance locations set in the virtual space, according to an elapsed time, and control to cause the second object appearing from the appearance location to disappear, according to an elapsed time.

With the above configuration, a game which is played, taking an elapsed time into account, can be carried out.

The controlling the second object may further include performing control to cause the second object to appear from each of an appearance location set in a first area in the virtual space and an appearance location set in a second area in the virtual space different from the first area.

With the above configuration, a game in which the first object gives an effect on a second object appearing from a plurality of appearance locations, can be carried out.

The first area may be set on one of opposite sides of the movement path of the first object, and the second area may be set on the other of the opposite sides of the movement path of the first object.

With the above configuration, a game in which the first object gives an effect on a second object appearing on either side of the movement path, can be carried out.

The controlling the second object may further include performing control to cause the second object to appear from an appearance location set in the second area with an increased probability after causing the second object to appear from an appearance location set in the first area.

With the above configuration, a game in which the user needs to pay attention to both sides of the movement path of the first object, can be carried out.

The first and second areas may have an arc shape and are substantially coaxial. The appearance location may not be set in a range located in a 0-o'clock direction of the arc shape or in a range located in a 6-o'clock direction of the arc shape.

With the above configuration, the user can be substantially prevented from playing while striking substantially an impossible pose.

The executing the game process may further include, when control to move the first object or change the orientation of the first object based on the motion data and control to cause the first object to perform an action based on the strain data are simultaneously attempted, performing the control to move the first object or change the orientation of the first object with higher priority.

With the above configuration, even when a plurality of operations is attempted with respect to input operations, an accurate process can be performed.

The executing the game process may further include causing a virtual character holding a ring-shaped virtual object copying the input apparatus to perform an action in the virtual space based on the motion data. The moving the first object or changing the orientation of the first object may further include causing the first object to move along a ring-shaped movement path set in the virtual space. The causing the virtual character to perform the action in the virtual space may further include controlling an action of the virtual character by changing a motion and/or orientation of the virtual object according to the motion and/or orientation of the input apparatus based on the motion data. The moving the first object or changing the orientation of the first object may further include causing the first object to move along the ring-shaped movement path according to the motion and/or orientation of the input apparatus based on the motion data.

With the above configuration, the user's feeling of togetherness is improved, and it is easier for the user to understand a game situation.

This non-limiting example may be carried out in the form of a storage medium storing an information processing program, an information processing apparatus, and an information processing method.

According to this non-limiting example, the first object can be caused to perform different actions according to an operation of moving the input apparatus and an operation of deforming the input apparatus, and therefore, the user's bodily sensation can be improved by operations performed using the input apparatus.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 13 is a diagram showing a first non-limiting example of an action of a player object OBJ that is performed according to the user's operation, FIG. 15 is a diagram showing a second non-limiting example of an action of a player object OBJ that is performed according to the user's operation, FIG. 16 is a diagram showing a third non-limiting example of an action of a player object OBJ that is performed according to the user's operation.

DETAILED DESCRIPTION OF NON-LIMITING EXAMPLE EMBODIMENTS

Figure 1:
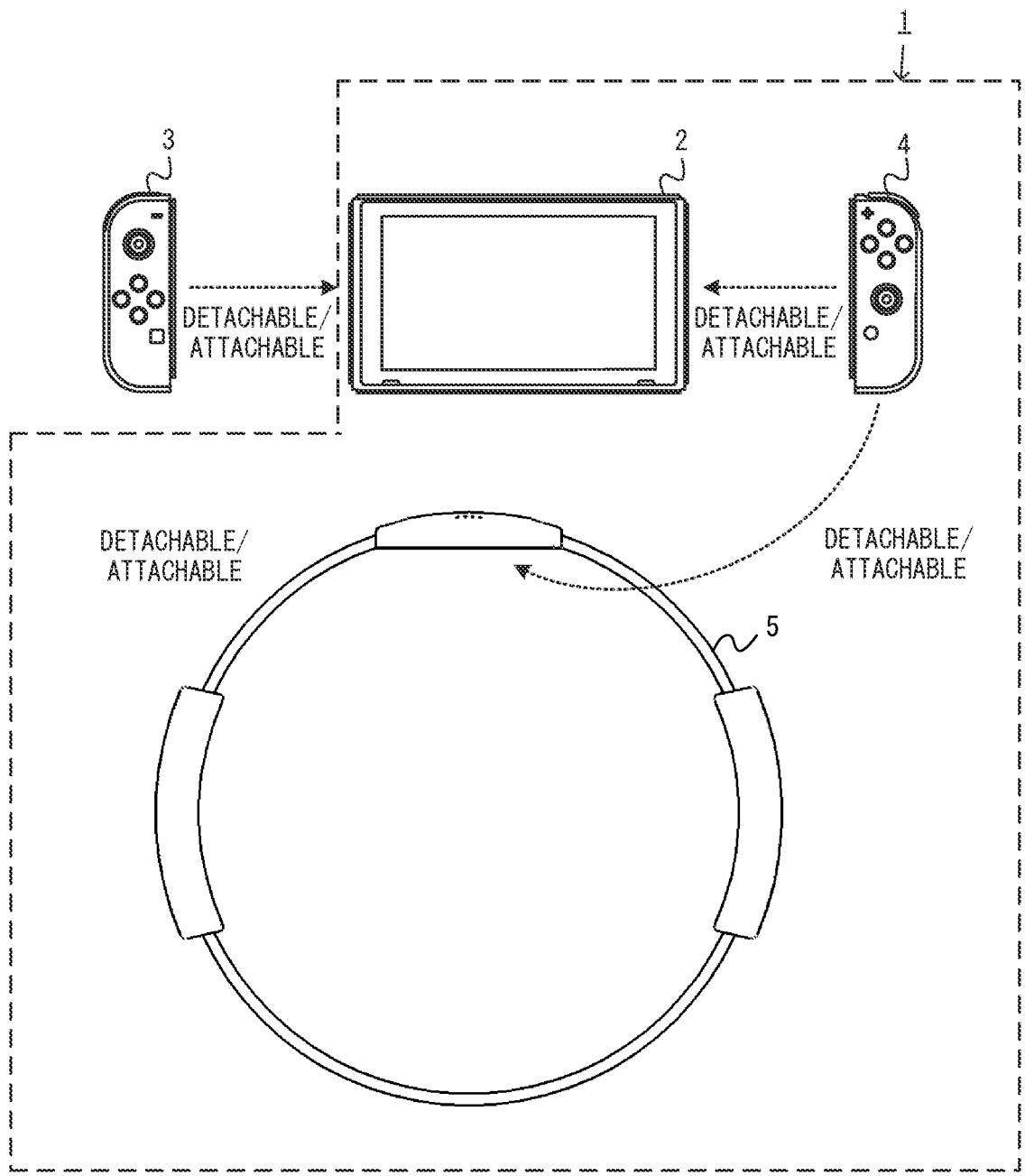
FIG. 1 is a diagram showing a non-limiting example of apparatuses included in a game system 1.

An information processing system according to this non-limiting example will now be described. The information processing system of this non-limiting example employs a game system 1 in a non-limiting example. FIG. 1 is a diagram showing a non-limiting example of apparatuses included in the game system 1. As shown in FIG. 1, the game system 1 includes a main body apparatus 2, a right controller 4, and a ring-shaped extension apparatus 5.

The main body apparatus 2 is an example of an information processing apparatus, and functions as a game device main body in this non-limiting example. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus."

The ring-shaped extension apparatus 5 is a non-limiting example of an extension apparatus that is used with the right controller 4. The ring-shaped extension apparatus 5 is used with the right controller 4 attached thereto. Thus, in this non-limiting example, the user can also use the controller 4 with the controller 4 attached to the extension apparatus (see FIG. 11). Note that the left control 3 may be attachable to the ring-shaped extension apparatus 5 in addition to or instead of the right controller 4.

Figure 2:
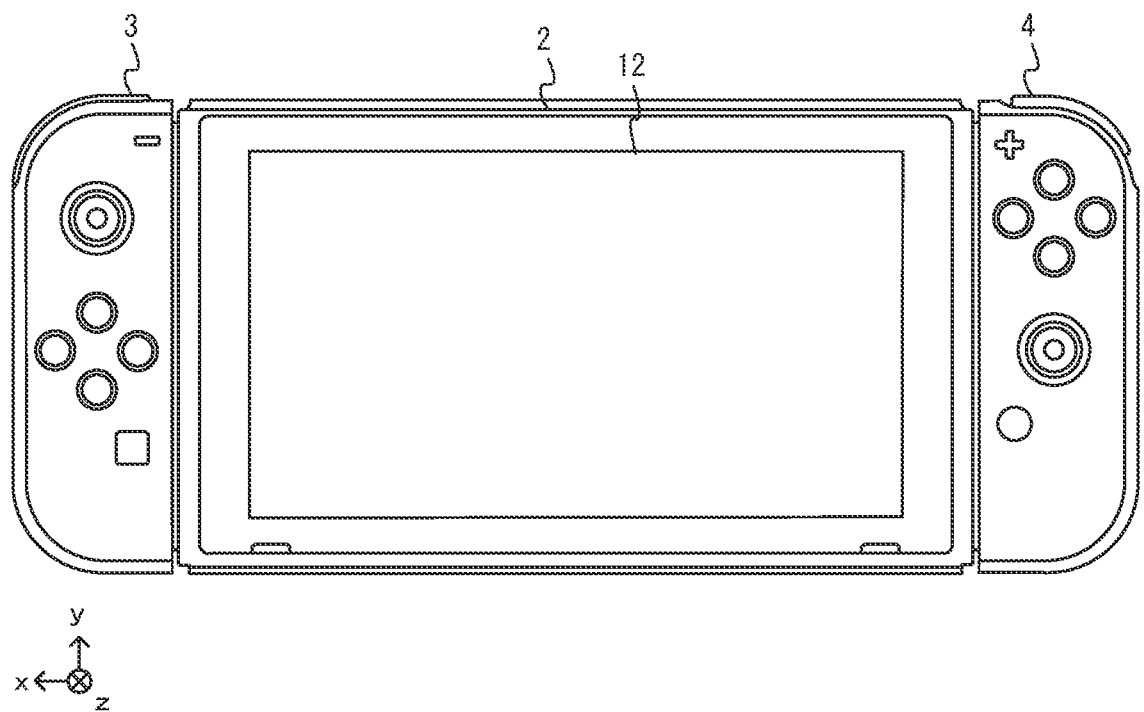
FIG. 2 is a diagram showing a non-limiting example of a state where a left controller 3 and a right controller 4 are attached to a main body apparatus 2.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
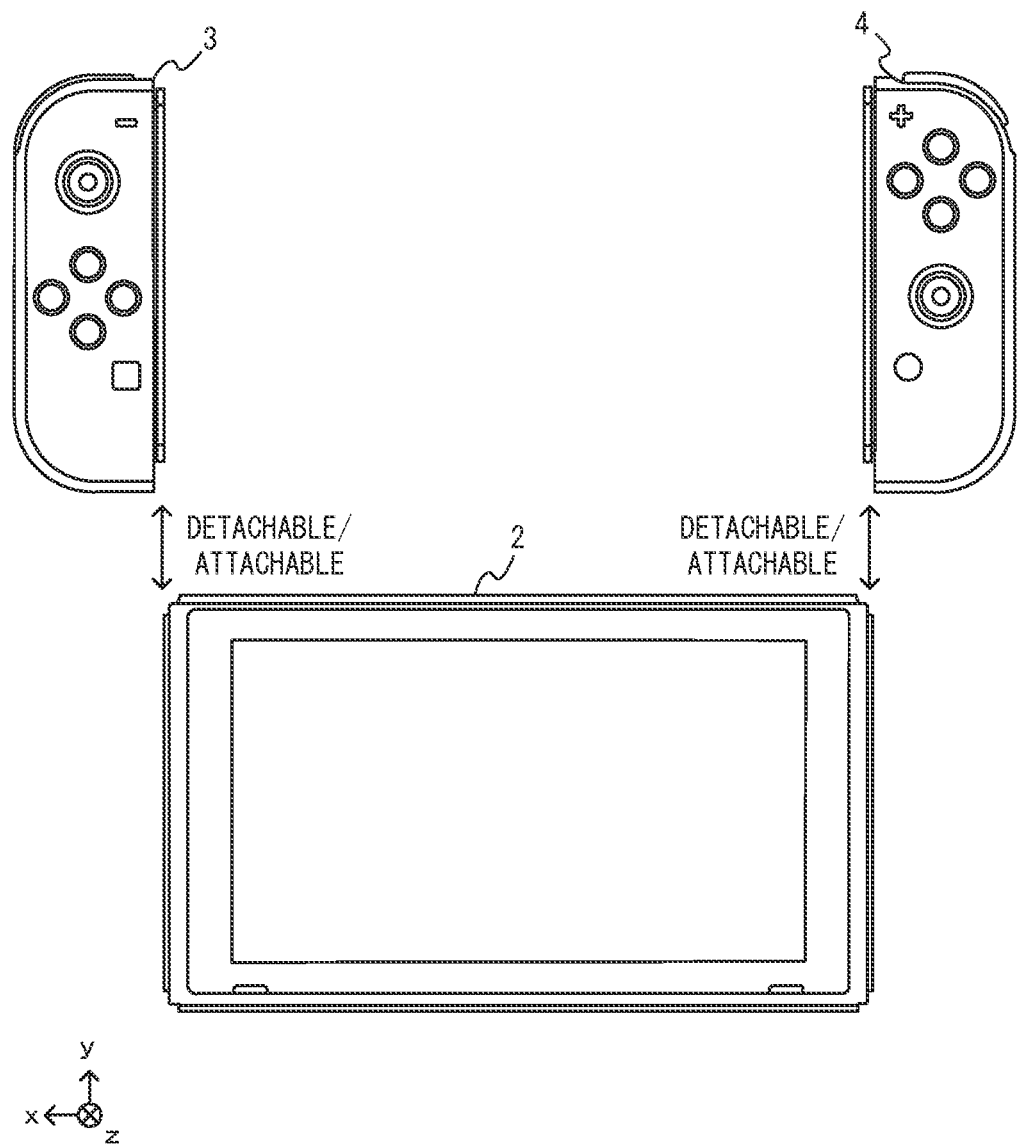
FIG. 3 is a diagram showing a non-limiting example of a state where each of the left controller 3 and the right controller 4 are detached from the main body apparatus 2.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller."

Figure 4:
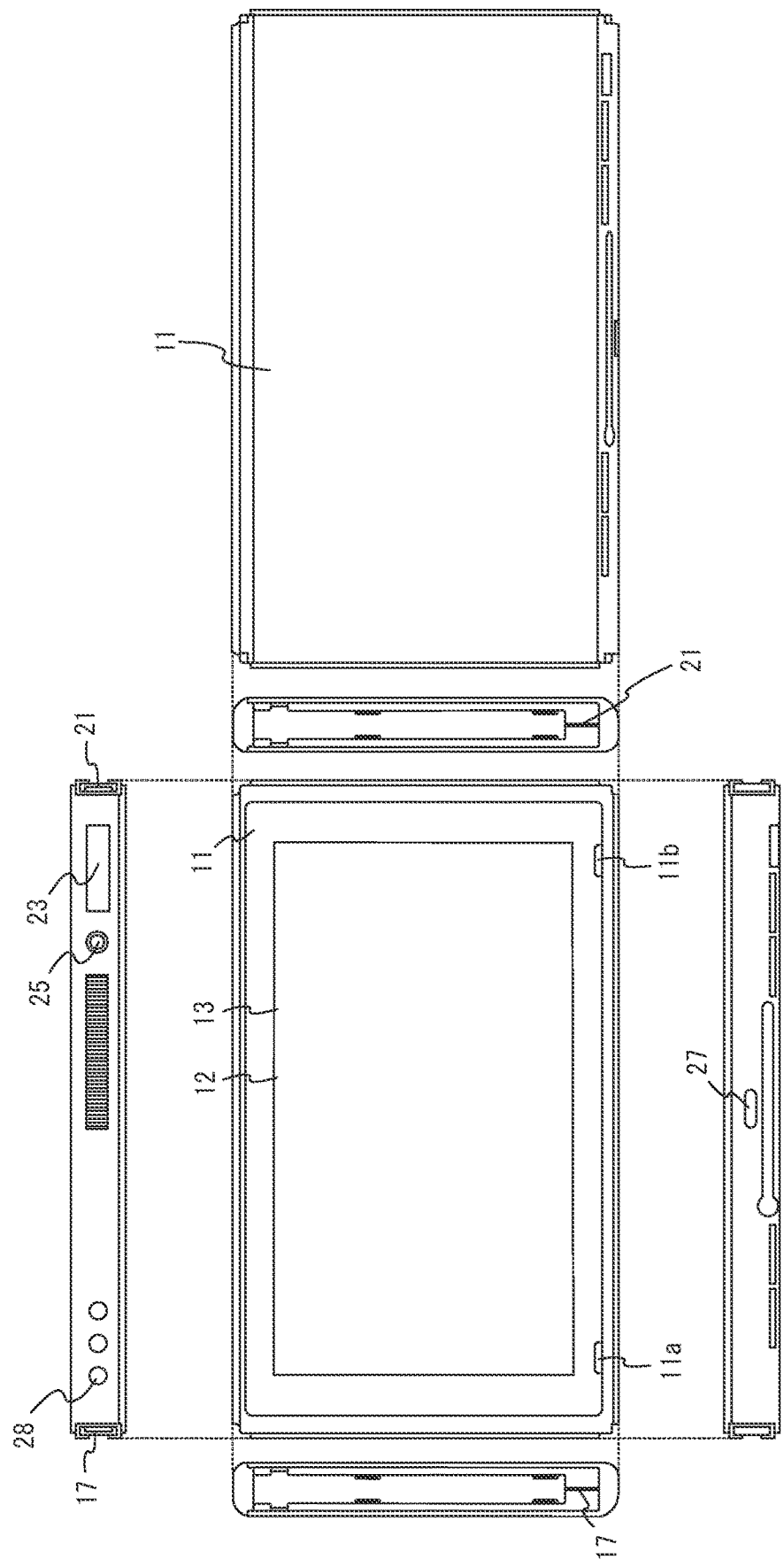
FIG. 4 is six orthogonal views showing a non-limiting example of the main body apparatus 2.

FIG. 4 is six orthogonal views showing an example of the main body apparatus 2. As shown in FIG. 4, the main body apparatus 2 includes an approximately plate-shaped housing 11. In this non-limiting example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In this non-limiting example, the display 12 is a liquid crystal display device (LCD). The display 12, however, may be a display device of any type.

In addition, the main body apparatus 2 includes a touch panel 13 on the screen of the display 12. In this non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 shown in FIG. 7) inside the housing 11. As shown in FIG. 4, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In this non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in this non-limiting example, the cradle has the function of charging the unified apparatus or the main body apparatus 2 alone, being placed thereon. The cradle also functions as a hub device (specifically, a USB hub).

Figure 5:
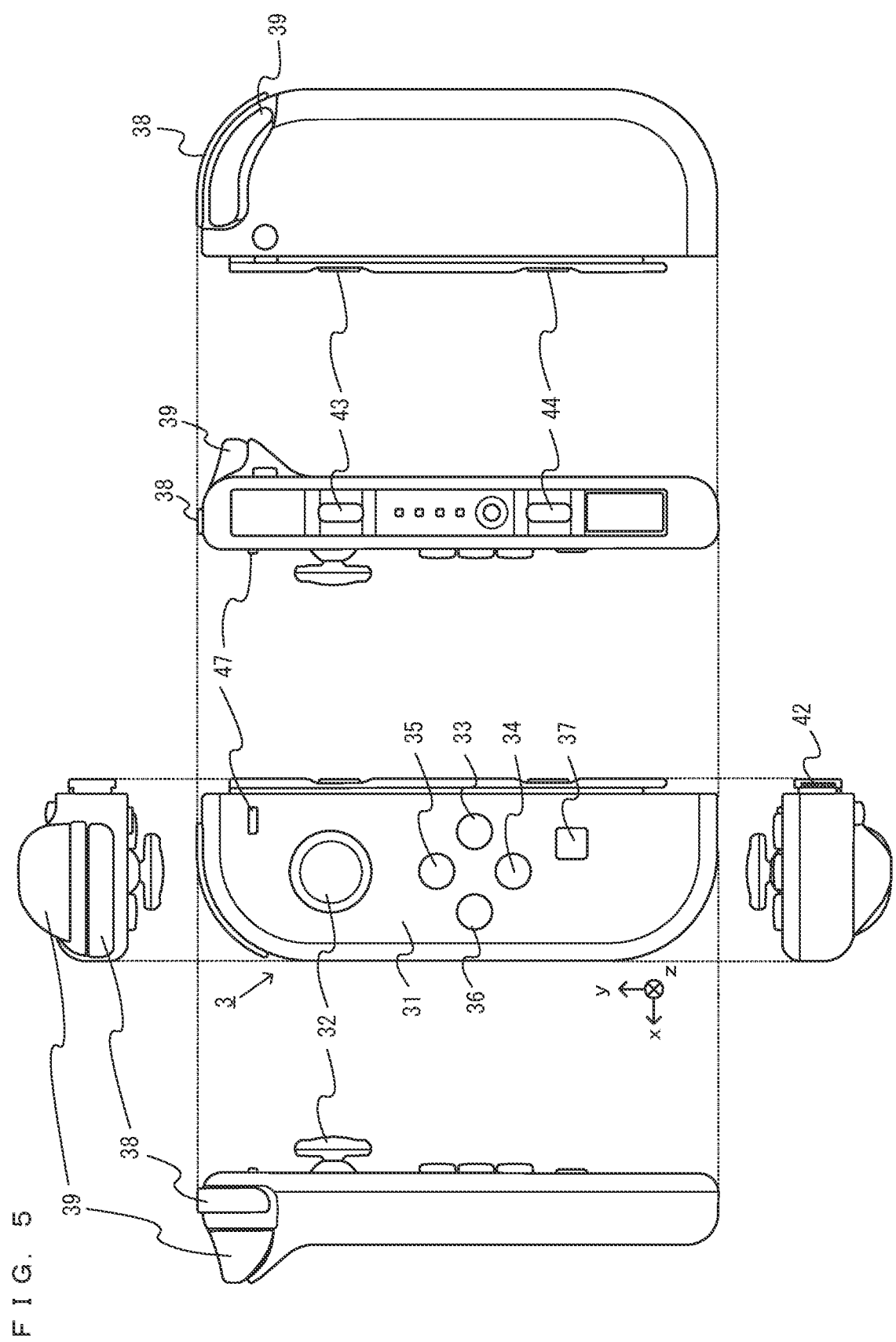
FIG. 5 is six orthogonal views showing a non-limiting example of the left controller 3.

FIG. 5 is six orthogonal views showing an example of the left controller 3. As shown in FIG. 5, the left controller 3 includes a housing 31. In this non-limiting example, the housing 31 has a vertically long shape, e.g., is shaped to be long in an up-down direction (i.e., a y-axis direction shown in FIGS. 2 and 5). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in this non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 6:
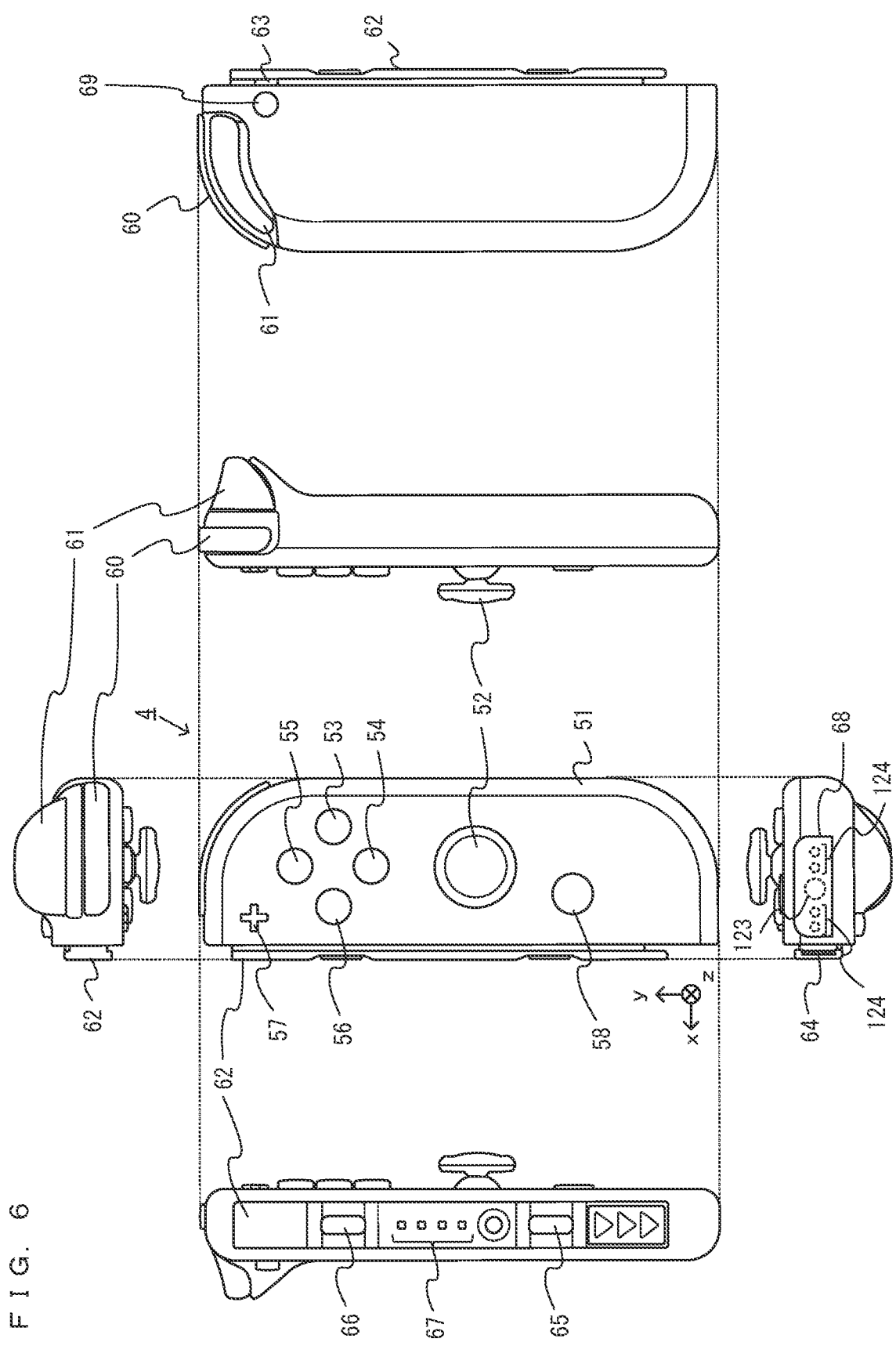
FIG. 6 is six orthogonal views showing a non-limiting example of the right controller 4.

FIG. 6 is six orthogonal views showing an example of the right controller 4. As shown in FIG. 6, the right controller 4 includes a housing 51. In this non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In this non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in this non-limiting example, the infrared image capturing section 123 itself includes a filter member for inhibiting the transmission of light of a wavelength other than light sensed by the camera (infrared light in this non-limiting example). In another non-limiting example, the window portion 68 may have the function of a filter.

Further, the right controller 4 includes a terminal 64 for allowing the right controller 4 to perform wired communication with the main body apparatus 2.

Figure 7:
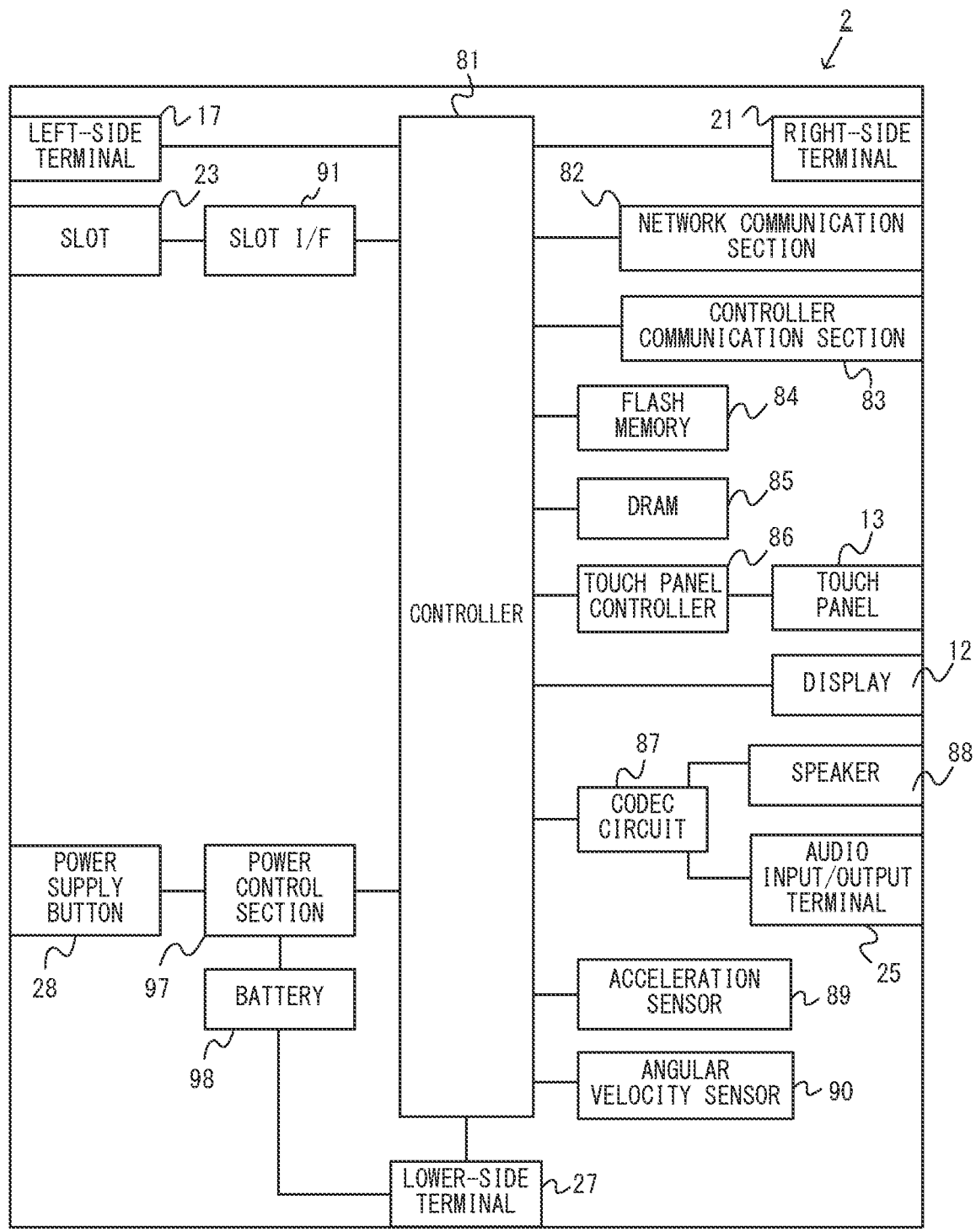
FIG. 7 is a block diagram showing a non-limiting example of an internal configuration of the main body apparatus 2.

FIG. 7 is a block diagram showing a non-limiting example of an internal configuration of the main body apparatus 2. The main body apparatus 2 includes components 81 to 91, 97, and 98 shown in FIG. 7 in addition to the components shown in FIG. 4. Some of the components 81 to 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing section (CPU), or may be a system-on-a-chip (SoC) having a plurality of functions such as a CPU function and a graphics processing section (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In this non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In this non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in this non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. In a non-limiting example, a first user can provide an input to the main body apparatus 2 using a first set of left and right controllers 3 and 4, and at the same time, a second user can provide an input to the main body apparatus 2 using a second set of left and right controllers 3 and 4.

The main body apparatus 2 includes a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

Further, the main body apparatus 2 includes an acceleration sensor 89. In this non-limiting example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this non-limiting example, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are connected to the processor 81. The detection results of the acceleration sensor 89 and the angular velocity sensor 90 are output to the processor 81. Based on the detection results of the acceleration sensor 89 and the angular velocity sensor 90, the processor 81 can calculate information about a motion and/or orientation of the main body apparatus 2.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 8:
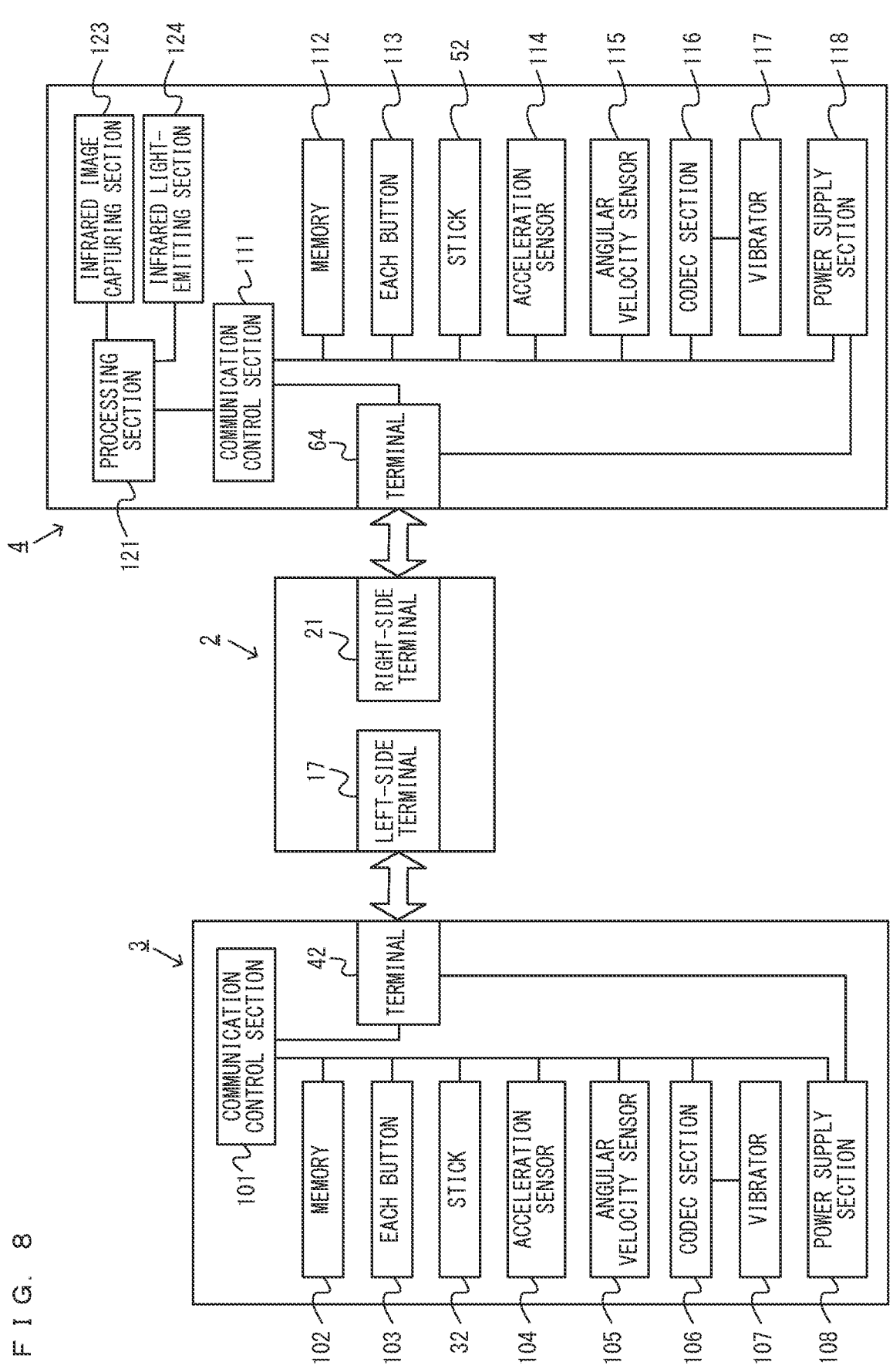
FIG. 8 is a block diagram showing examples of internal configurations of the main body apparatus 2, the left controller 3, and the right controller 4.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, a communication control section 101 is connected to components including the terminal 42. In this non-limiting example, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In this non-limiting example, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In this non-limiting example, an angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In this non-limiting example, the vibrator 107 is controlled by a command from the main body apparatus 2. That is, if receiving the above command from the main body apparatus 2, the communication control section 101 drives the vibrator 107 in accordance with the received command Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In this non-limiting example, a vibration control signal transmitted from the main body apparatus 2 to the left controller 3 may be a digital signal representing the frequency and the amplitude every unit of time. In another non-limiting example, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In this non-limiting example, the power supply section 108 includes a battery and a power control circuit. Although not shown in FIG. 8, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3. It should be noted that the inertial sensors (e.g., the acceleration sensor 114 and the angular velocity sensor 115) correspond to a non-limiting example of a motion sensor.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in this non-limiting example, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in this non-limiting example, the infrared image capturing section 123 including an infrared camera is used. In another non-limiting example, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Figure 9:
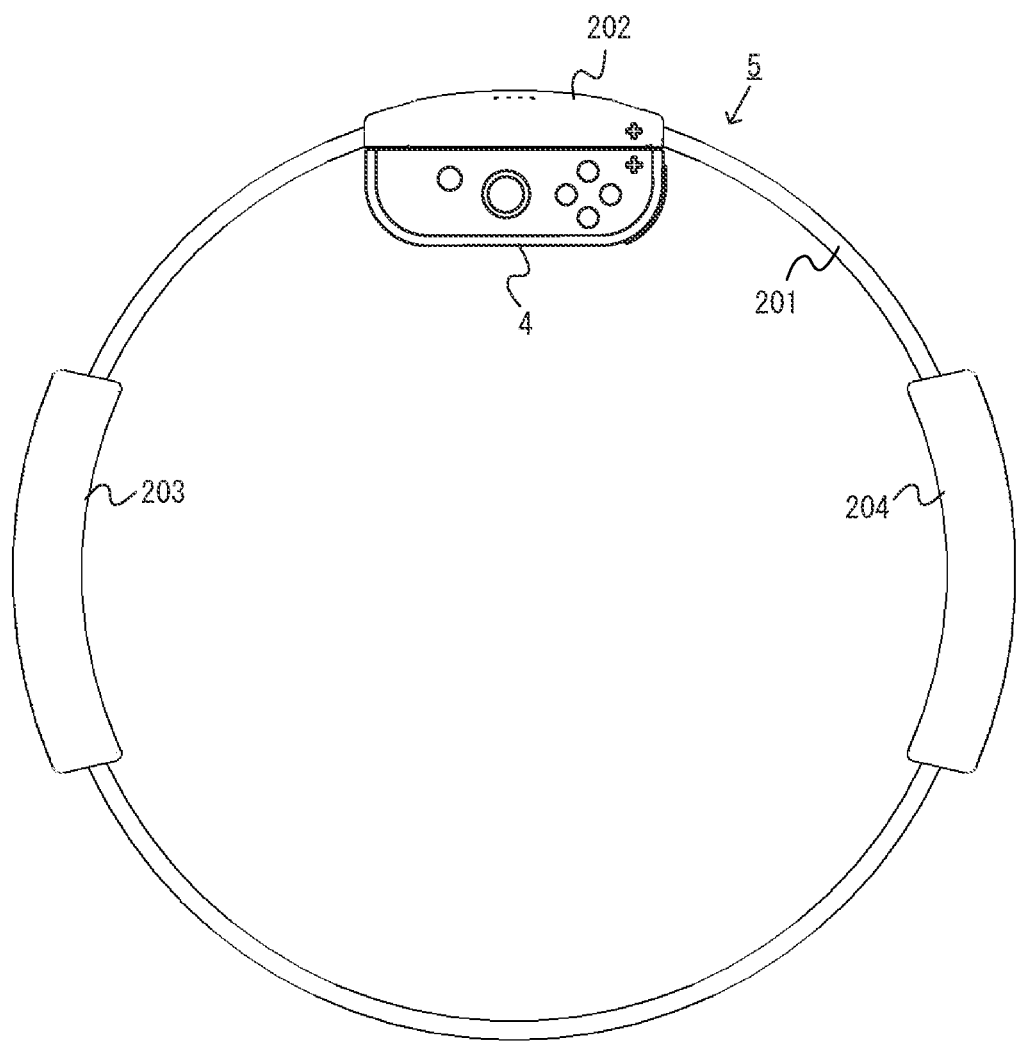
FIG. 9 is a diagram showing a non-limiting example of a ring-shaped extension apparatus.

FIG. 9 is a diagram showing a non-limiting example of a ring-shaped extension apparatus. It should be noted that FIG. 9 shows the ring-shaped extension apparatus 5 with the right controller 4 attached thereof. In this non-limiting example, the ring-shaped extension apparatus 5 is an extension apparatus to which the right controller 4 can be attached. Although the details will be described later, the user performs a novel operation of applying a force to, and deforming, the ring-shaped extension apparatus 5 in this non-limiting example. The user can operate the ring-shaped extension apparatus 5 by performing a fitness exercise operation using the ring-shaped extension apparatus 5 as if the user were doing an exercise, for example. It should be noted that the ring-shaped extension apparatus 5 corresponds to a non-limiting example of the input apparatus.

As shown in FIG. 9, the ring-shaped extension apparatus 5 includes a ring-shaped portion 201 and a main portion 202. The ring-shaped portion 201 has a ring shape. Note that in this non-limiting example, the ring-shaped portion 201 includes an elastic member and a base portion to be described below, which together form a ring shape. In this non-limiting example, the ring-shaped portion 201 has a circular ring shape. Note that in other non-limiting examples, the ring-shaped portion 201 may be of any suitable shape, e.g., an elliptical ring shape.

The main portion 202 is provided on the ring-shaped portion 201. The main portion 202 has a rail portion (not shown). The rail portion is a non-limiting example of an attachment portion to which the right controller 4 can be attached. In this non-limiting example, the rail portion is slidably engaged with a slider 62 (see FIG. 6) of the right controller 4. When the slider 62 is inserted into a rail member in a predetermined linear direction (i.e., a slide direction), the rail member is engaged with the slider 62 while the slider 62 is allowed to be slid in the linear direction relative to the rail member. Note that the rail portion is similar to that of the main body apparatus 2 in that the rail portion can be slidably engaged with the slider of the controller. Therefore, the rail portion may have a structure similar to that of the rail portion of the main body apparatus 2.

In this non-limiting example, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion is provided with a notch. In a state where the slider 62 is inserted to the far end of the rail portion, the latch portion 63 snaps into the notch. With the slider 62 inserted to the far end of the rail portion 211, the latch portion 63 snaps into the notch 219. As the latch portion 63 engages with the notch while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 has grip covers 203 and 204. The grip covers 203 and 204 are parts that are held by the user. In this non-limiting example, the grip covers 203 and 204 are removable from the ring-shaped portion 201. In this non-limiting example, the left grip cover 203 is provided on the left grip portion near the left end of the ring-shaped portion 201, and the right grip cover 204 is provided on the right grip portion near the right end of the ring-shaped portion 201. Note that there is no limitation on the number of grip portions, and the grip portions may be provided at three or more locations, or at only one location, depending on the operation method or methods contemplated. Depending on the content of the game (or the content of the fitness exercise operation to be performed by the user in the game), only a particular one or particular ones of a plurality of grip portions may be held by one hand or both hands.

Figure 10:
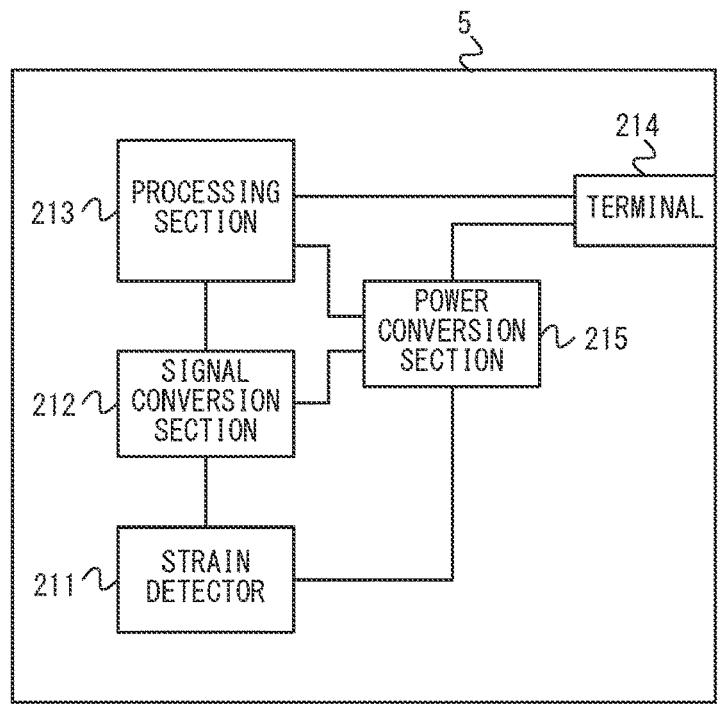
FIG. 10 is a block diagram showing a non-limiting electrical coupling relationship between components included in the ring-shaped extension apparatus 5.

FIG. 10 is a block diagram showing a non-limiting electrical connection relationship between components included in the ring-shaped extension apparatus 5. As shown in FIG. 10, the ring-shaped extension apparatus 5 includes a strain detector 211. The strain detector 211 is a non-limiting example of a detector that detects when the ring-shaped portion 201 is deformed. In this non-limiting example, the strain detector 211 includes a strain gauge. The strain detector 211 outputs a signal indicating a strain of a base portion that depends on a deformation of an elastic member to be described below (in other words, a signal indicating the magnitude and direction of deformation of the elastic member).

Here, in this non-limiting example, the ring-shaped portion 201 has an elastically deformable elastic portion and a base portion. The base portion holds opposite end portions of the elastic member so that the base portion and the elastic member together form a ring. Note that the base portion is provided inside the main portion 202, and therefore, is not shown in FIG. 9. The base portion is formed of a material having a stiffness higher than that of the elastic member. For example, the elastic member is formed of a resin (specifically, a fiber reinforced plastic (FRP)), and the base portion is formed of a metal. The strain gauge, which is provided on the base portion, detects a strain of the base portion. When the ring-shaped portion 201 is deformed from a steady state thereof, a strain occurs in the base portion due to the deformation. The strain of the base portion is detected by the strain gauge. Based on the detected strain, a direction (i.e., a direction in which the two grip covers 203 and 204 move toward each other or away from each other) and amount of deformation of the ring-shaped portion 201 can be calculated.

Note that in another non-limiting example, the strain detector 211 includes any suitable sensor that can detect when the ring-shaped portion 201 is deformed from the steady state, instead of the strain gauge. For example, the detector 211 may include a pressure sensor that can detect an applied pressure when the ring-shaped portion 201 is deformed, or a flex sensor that can detect the amount of bending of the ring-shaped portion 201.

The ring-shaped extension apparatus 5 includes a signal conversion section 212. In this non-limiting example, the signal conversion section 212 includes an amplifier and an A/D converter. The signal conversion section 212 is electrically connected to the strain detector 211, and amplifies an output signal from the strain detector 211 by the amplifier and performs an A/D conversion by the A/D converter. The signal conversion section 212 outputs a digital signal indicating a strain value detected by the strain detector 211. Note that in another non-limiting example, the signal conversion section 212 may not include an A/D converter, and a processing section 213 to be described below may include an A/D converter.

The ring-shaped extension apparatus 5 includes a processing section 213. The processing section 213 is a processing circuit including a processor and a memory, and is, for example, a microcontroller unit (MCU). The processing section 213 is electrically connected to the signal conversion section 212, and receives an output signal from the signal conversion section 212. The ring-shaped extension apparatus 5 includes a terminal 214. The terminal 214 is electrically connected to the processing section 213. When the right controller 4 is attached to the ring-shaped extension apparatus 5, the processing section 213 sends information (in other words, ring operation data to be described below) indicating a strain value indicated by an output signal from the signal conversion section 212 to the right controller 4 via the terminal 214.

The ring-shaped extension apparatus 5 includes a power conversion section 215. The power conversion section 215 is electrically connected to the above elements 211-214. The power conversion section 215 supplies external power received via the terminal 214 (i.e., power supplied from the right controller 4) to the elements 211-214. The power conversion section 215 may, for example, adjust the voltage of the received power before supplying the power to the elements 211-214.

Note that the "data regarding the detection result of the strain detector" that is transmitted by the ring-shaped extension apparatus 5 to another device may be data representing the detection result (in this non-limiting example, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member based on the strain value, which is the detection result, and the "data regarding the detection result of the strain detector" may be data that represents the amount of deformation.

Note that in other non-limiting examples, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
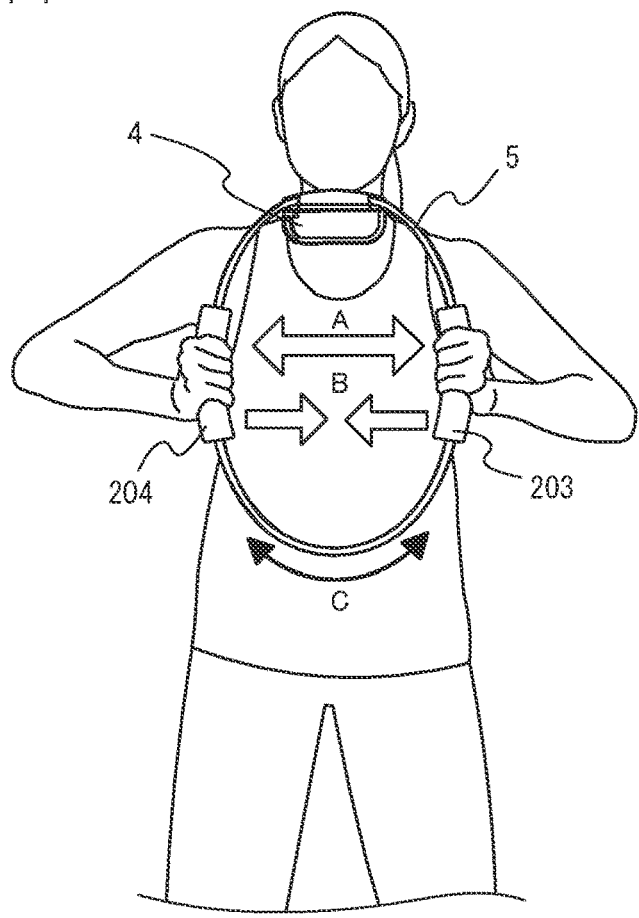
FIG. 11 is a diagram showing a non-limiting example of how the user uses the ring-shaped extension apparatus 5.

FIG. 11 is a diagram showing how the user uses the ring-shaped extension apparatus 5. As shown in FIG. 11, the user can play a game using the ring-shaped extension apparatus 5 in addition to the game apparatus (i.e., the main body apparatus 2 and the right controller 4).

For example, as shown in FIG. 11, the user holds, with both hands, the ring-shaped extension apparatus 5 with the right controller 4 attached thereto. In this case, the user can play a game by performing an operation on the ring-shaped extension apparatus 5 (e.g., an operation of bending the ring-shaped extension apparatus 5 and an operation of moving the ring-shaped extension apparatus 5).

Note that FIG. 11 illustrates the user's action of bending the ring-shaped extension apparatus 5 while holding the grip covers 203 and 204. By performing such an action, the user can perform a fitness exercise action for exercising both arms as a gaming operation. Note that the user can perform various actions on the ring-shaped extension apparatus 5 to perform gaming operations. For example, the user holds one of the grip covers with both hands, and performs an action of bending the ring-shaped extension apparatus 5 with the other grip cover in contact with the abdomen. By this action, the user can perform a fitness exercise action for exercising arm muscles and abdominal muscles as a gaming operation. The user can also perform an action of bending the ring-shaped extension apparatus 5 with the ring-shaped extension apparatus 5 between both legs, particularly the grip covers 203 and 204 being in contact with both inner thighs. By this action, the user can perform a fitness exercise action of exercising leg muscles as a gaming operation.

Where the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in the state that the right controller is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

Figure 12:
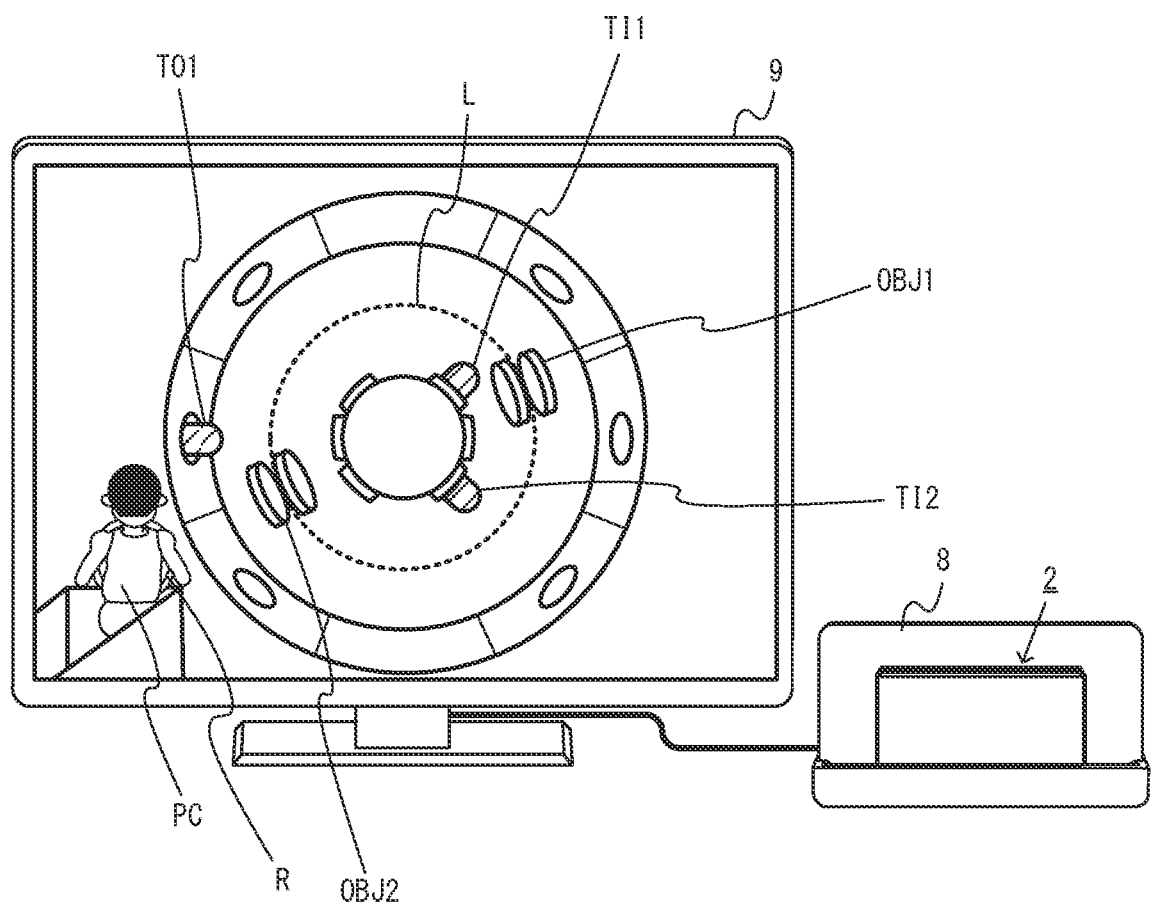
FIG. 12 is a diagram showing a non-limiting example of a game image that is displayed on the stationary monitor 9 according to the user's operation.
Figure 14:
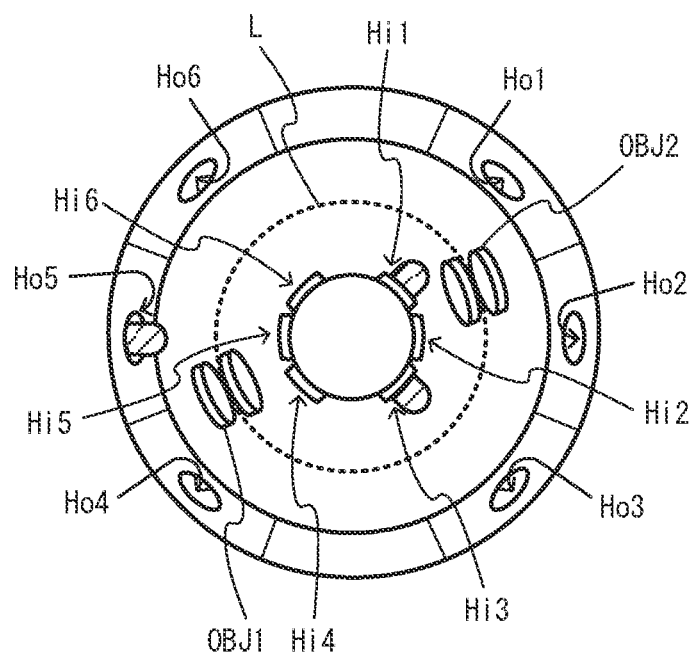
FIG. 14 is a diagram showing a non-limiting example of locations where target objects TI and TO appear.

Next, before describing a specific process performed by the main body apparatus 2, the game performed in the main body apparatus 2 will be outlined with reference to FIGS. 12-16. Note that FIG. 12 is a diagram showing a non-limiting example of a game image that is displayed on the stationary monitor 9 according to the user's operation. FIG. 13 is a diagram showing a first non-limiting example of an action of a player object OBJ that is performed according to the user's operation. FIG. 14 is a diagram showing locations where target objects TI and TO appear. FIG. 15 is a diagram showing a second non-limiting example of an action of a player object OBJ that is performed according to the user's operation. FIG. 16 is a diagram showing a third non-limiting example of an action of a player object OBJ that is performed according to the user's operation.

As described above, in the game system 1 of this non-limiting example, the left controller 3 and the right controller 4 are removable from the main body apparatus 2. In addition, as shown in FIG. 12, when the main body apparatus 2 alone is attached to the cradle 8, an image (and sound) can be output from the stationary monitor 9. The game system 1 will now be described, assuming the situation that the left controller 3 and the right controller 4 are removed from the main body apparatus 2, the main body apparatus 2 alone is attached to the cradle 8, and an image (and sound) is output from the stationary monitor 9 connected to the cradle 8. In a non-limiting example, the user performs a gaming operation using the ring-shaped extension apparatus 5 with the right controller 4 attached thereto. In a non-limiting example of a game process, a process of allowing a player object OBJ displayed on the stationary monitor 9 to move in the virtual game space and attack a target object T (TI and TO) according to the user's operation, is used. Note that a player object OBJ (player objects OBJ1 and OBJ2 to be described below) corresponds to a non-limiting example of a first object, and a target object T (target objects TI and TO) corresponds to a non-limiting example of a second object.

For example, in FIG. 12, a game image in which target objects TI and/or TO are hit by player objects OBJ so that the hit target objects TI and/or TO are knocked down, is displayed on the stationary monitor 9. The user performs an operation of turning the ring-shaped extension apparatus 5 or an operation of deforming the ring-shaped extension apparatus 5 while holding the ring-shaped extension apparatus 5 with the right controller 4 attached thereto. In this case, two player objects OBJ1 and OBJ2 move along a circular path L according to the user's operation of turning the ring-shaped extension apparatus 5. The two player objects OBJ1 and OBJ2 move and thrust toward the outside or inside of the circular path L according to the user's operation of deforming the ring-shaped extension apparatus 5. The player character PC is disposed at a location where the player character PC sees target objects TI and player objects OBJ while holding a ring object R with both hands. The ring object R is changed and turned by the player character PC in the virtual game space according to an operation of turning the ring-shaped extension apparatus 5 in the real space. Thus, by displaying the player character PC which performs an action copying the user's action, the user's feeling of togetherness with the player character PC is improved, and it is easier for the user to understand a game situation.

For example, in this non-limiting example, as shown in FIG. 13, the user performs an operation of turning the ring-shaped extension apparatus 5 while holding the ring-shaped extension apparatus 5 with both hands in the real space. By the user's operation of turning the ring-shaped extension apparatus 5, an operation input corresponding to the direction is given to the main body apparatus 2.

Here, as shown in FIG. 13, the operation of turning the ring-shaped extension apparatus 5 means an operation of turning the ring-shaped extension apparatus 5 around a circular-ring axis of the ring-shaped portion 201 of the ring-shaped extension apparatus 5 (a roll operation of turning the ring-shaped extension apparatus 5 in a C direction in FIG. 13). The locations of the player objects OBJ in the virtual game space are moved along the circular path L by a turning angle that the user turns the ring-shaped extension apparatus 5 while holding the ring-shaped extension apparatus 5 by both hands.

Here, in the roll operation of turning the ring-shaped extension apparatus 5 around the circular-ring axis, the direction of the gravitational acceleration acting on the ring-shaped extension apparatus 5 changes. Therefore, the direction of the gravitational acceleration acting on the right controller 4 can be calculated using an acceleration and/or angular velocity acting on the right controller 4 attached to the ring-shaped extension apparatus 5. Actually, the operation of turning the ring-shaped extension apparatus 5 is a combination of a roll operation, a pitch operation, and a yaw operation. Therefore, a final turning angle may be calculated by combining directions of the ring-shaped extension apparatus 5 that are changed by the roll operation, pitch operation, and yaw operation.

For example, it is assumed that as shown in FIG. 13, the user performs an operation of turning the ring-shaped extension apparatus 5 from an initial state (neutral state in which the grip covers 203 and 204 are disposed on the left and right sides in the real space) in which the ring-shaped extension apparatus 5 is held by the user so that the y-axis direction of the right controller 4 attached to the ring-shaped extension apparatus 5 is the horizontal direction (an X axis direction in FIG. 13) in the real space, and the positive x-axis direction of the right controller 4 attached to the ring-shaped extension apparatus 5 is the direction pointing directly upward from the right controller 4 in the real space (a positive Y axis direction in FIG. 13). In the initial state, the gravitational acceleration acts on the right controller 4 attached to the ring-shaped extension apparatus 5 in the vertical direction, and therefore, the acceleration in the negative x-axis direction of the right controller 4 is 1 G, and the accelerations in the y-axis (lateral direction) and the z-axis direction (front-back direction) are zero. When a roll operation is performed on the ring-shaped extension apparatus 5 in the initial state, the turning angle by which the roll operation is performed can be calculated from the magnitude of an angular velocity occurring about the z-axis direction of the right controller 4 or an acceleration acting in the y-axis direction of the right controller 4. Therefore, by detecting the angular velocity and/or acceleration acting on the right controller 4, the turning angle by which a roll operation is performed on the ring-shaped extension apparatus 5 and the orientation of the ring-shaped extension apparatus 5 in the real space produced by the roll operation (e.g., an angle $\theta$ between the gravitational acceleration g and a straight line Dh connecting the grip covers 203 and 204) can each be calculated.

The two player objects OBJ1 and OBJ2 in the virtual game space move along the circular path L according to the above roll operation with the positional relationship therebetween maintained. Specifically, the two player objects OBJ1 and OBJ2 move along the circular path L with the two player objects OBJ1 and OBJ2 located opposite each other on the circular path L (i.e., the two player objects OBJ1 and OBJ2 are furthest from each other on the circular path L). The two player objects OBJ1 and OBJ2 move according to the roll operation performed on the ring-shaped extension apparatus 5 so that the angle $\theta$ between a straight line D12 connecting the two player objects OBJ1 and OBJ2 and a vertical direction g in the virtual game space is equal to the angle $\theta$ between the straight line Dh connecting the grip covers 203 and 204 in the real space and the gravitational acceleration g. In other words, the locations of the two player objects OBJ1 and OBJ2 on the circular path L are set to be identical to the locations of the grip covers 203 and 204 of the ring-shaped extension apparatus 5 in the real space with respect to the circular-ring axis as the center.

Here, as shown in FIG. 14, a plurality of holes (a plurality of appearance locations Hi) for allowing a target object TI to appear are provided inside the circular path L, and a plurality of holes (a plurality of appearance locations Ho) for allowing a target object TO to appear are provided outside the circular path L. For example, in a non-limiting example of FIG. 14, six appearance locations Hi1-Hi6 and six appearance locations Ho1-Ho6 are provided. A target object TI appears randomly from at least one of the six appearance locations Hi1-Hi6, popping out toward the circular path L. A target object TO appears randomly from at least one of the six appearance locations Ho1-Ho6, popping out toward the circular path L. Target objects TI and TO appearing from any of the appearance locations Hi1-Hi6 or the appearance locations Ho1-Ho6 retreat to the appearance locations from which the target objects TI and TO have appeared, and disappear from the virtual game space, after a predetermined time has elapsed.

After disposing the player objects OBJ1 and OBJ2 at desired locations by performing an operation of turning the ring-shaped extension apparatus 5, the user can cause at least a portion of the player objects OBJ1 and OBJ2 to move and thrust toward the inside or outside of the circular path L, by performing a predetermined operation on the ring-shaped extension apparatus 5. In a non-limiting example, the predetermined operation is an operation of deforming the ring-shaped portion 201 from the steady state to at least a predetermined state so that the grip covers 203 and 204 move away from each other in the ring-shaped extension apparatus 5, which is detected based on a strain detected by the strain gauge provided in the ring-shaped extension apparatus 5. In another non-limiting example, the predetermined operation is an operation of deforming the ring-shaped portion 201 from the steady state to at least a predetermined state so that the grip covers 203 and 204 move toward each other in the ring-shaped extension apparatus 5, which is detected based on a strain detected by the strain gauge provided in the ring-shaped extension apparatus 5. In either case, when the ring-shaped portion 201 of the ring-shaped extension apparatus 5 is deformed from the steady state, a strain of the base portion is detected by the strain gauge, and based on the detected strain, a direction in which the ring-shaped portion 201 is deformed (i.e., the direction in which the two grip covers 203 and 204 move away from or toward each other) and the amount of deformation can be calculated. If the direction in which the ring-shaped portion 201 is deformed is the direction in which the two grip covers 203 and 204 move away from or toward each other, and the amount of deformation is greater than or equal to a preset threshold, it is determined that the predetermined operation has been performed.

For example, as shown in FIG. 15, when an operation (a pulling operation for deformation in an A direction in FIG. 15) is performed to deform the ring-shaped extension apparatus 5 so that the ring-shaped portion 201 is changed from the steady state to at least a predetermined state, and the grip covers 203 and 204 move away from each other, an outer player object OBJ1o which is an outer portion of the player object OBJ1 and an outer player object OBJ2o which is an outer portion of the player object OBJ2 each move outward (i.e., an a-direction in which the appearance locations Ho1-Ho6 are provided) from the circular path L. When the outer player objects OBJ1o and OBJ2o move outward and reach locations, then if a target object TO has appeared at the location(s), and is hit by the outer player object OBJ1O or OBJ2o, the hit target object TO is knocked down and disappears from the virtual game space, and predetermined game points are obtained.

As shown in FIG. 16, when an operation (a pushing operation for deformation in a B direction in FIG. 16) is performed to deform the ring-shaped extension apparatus 5 so that the ring-shaped portion 201 is changed from the steady state to at least a predetermined state, and the grip covers 203 and 204 move toward each other, an inner player object OBJ1i which is an inner portion of the player object OBJ1 and an inner player object OBJ2i which is an inner portion of the player object OBJ2 each move inward (i.e., a b-direction in which the appearance locations Hi1-Hi6 are provided) from the circular path L. If the inner player objects OBJ1i and OBJ2i move inward and reach locations, then if a target object TI has appeared at the location(s), and is hit by the inner player object OBJ1i or OBJ2i, the hit target object TI is knocked down and disappears from the virtual game space, and predetermined game points are obtained.

Thus, in the above game process, while the player objects OBJ are turned and moved along the circular path L according to a roll operation of turning the ring-shaped extension apparatus 5, the player objects OBJ can be moved in one direction away from the circular path L according to an operation of deforming the ring-shaped extension apparatus 5 in one direction, or the player objects OBJ can be moved in the other direction away from the circular path L according to an operation of deforming the ring-shaped extension apparatus 5 in the other direction. Target objects T appear and retreat repeatedly and randomly inside and outside the circular path L, along which the player objects OBJ are moved, the target objects T appearing inside and outside can be knocked down by deforming the ring-shaped extension apparatus 5 in the two directions. Thus, a so-called "whack-a-mole game" can be provided.

Note that the operations performed using the ring-shaped extension apparatus 5 may be determined using an output from the left controller 3 or another input apparatus in addition to an output from a motion sensor included in the right controller 4 (the ring-shaped extension apparatus 5).

In the foregoing, an example in which a process is performed using the x-, y-, and z-axes defined in the right controller 4 is discussed in order to provide a specific description. Actually, the x-, y-, and z-axes may be disposed in the real space in directions different from those in the above example, and it may be necessary to detect an orientation with reference to different directions, depending on a change in the orientation of the ring-shaped extension apparatus 5. For example, in an actual detection of the orientation of the ring-shaped extension apparatus 5, the orientation may be calculated with reference to three orthogonal axes in the real space, e.g., the lateral direction (the X axis direction in the drawings), the vertical direction (the Y axis direction in the drawings), and the front-back direction (the Z axis direction in the drawings) in the real space.

When a roll operation of turning the ring-shaped extension apparatus 5 and an operation of deforming the ring-shaped extension apparatus 5 are performed simultaneously, one of the operations may have higher priority. For example, when the roll operation and the deformation operation are performed simultaneously, the movement of the player objects OBJ in a direction away from the circular path L by the deformation operation may be canceled, and the movement of the player objects OBJ along the circular path L by the roll operation may be performed with higher priority. In a non-limiting example, the movement in a direction away from the circular path L may be canceled, and the player objects OBJ may be caused to retreat to the locations where the player objects OBJ were located before the movement (the locations where the player objects OBJ do not thrust in a direction away from the circular path L), and the player objects OBJ may be moved along the circular path L. In that case, in order to move the player objects OBJ for which the movement in a direction away from the circular path L has been canceled, in a direction away from the circular path L again, it may be necessary to temporarily stop the deformation operation, return the ring-shaped portion 201 to the steady state, and newly perform a deformation operation on the ring-shaped extension apparatus 5.

As can be seen from the non-limiting example game images of FIGS. 12-16, an appearance location H where a target object T appears may be provided, except for top and bottom locations exactly and nearly in the 0-o'clock direction (the upward direction) and 6-o'clock direction (the downward direction) of the circular path L. If the user tries to attack a target object T appearing at such a top or bottom location, it is necessary to dispose the player objects OBJ at a location exactly or nearly in the 0-o'clock and 6-o'clock directions of the circular path L. Therefore, the user is required to turn the ring-shaped extension apparatus 5 so that the grip covers 203 and 204 of the ring-shaped extension apparatus 5 are aligned vertically in the real space. However, it may be substantially impossible for the user, holding the grip covers 203 and 204 with both hands, to put the grip covers 203 and 204 into such a vertical position, i.e., strike such a pose. However, as described above, by setting the virtual game space so that a target object T does not appear at the top or bottom location, the user can be substantially prevented from putting the grip covers 203 and 204 into such a vertical position, i.e., striking such a pose.

A plurality of target objects T may appear simultaneously from different appearance locations H. As described above, two locations can be attacked simultaneously using the two player objects OBJ according to an operation performed on the ring-shaped extension apparatus 5, resulting in a wide variety of operations. Note that a predetermined rule may be applied to an appearance pattern in which target objects T appear at appearance locations H. For example, an appearance pattern may be set so that during a period of time after a target object TI appears at an appearance location on one side (e.g., an appearance location Hi inside the circular path L), a target object TO appears at an appearance location on the other side (e.g., an appearance location Ho outside the circular path L) with a higher probability. This motivates the user to perform an operation of deforming the ring-shaped extension apparatus 5 in different directions.

As described above, a player object OBJ includes an inner player object OBJi disposed inside the movement path L and an outer player object OBJo disposed outside the movement path L. Alternatively, each may be considered as a separate object. In that case, it can also be considered that the inner player object OBJi and the outer player object OBJo move along the circular path L according to the user's roll operation with one of the player objects carrying the other, and the second player object can be moved (fired) from the first player object according to the user's deformation operation, i.e., another object can be moved according to the user's deformation operation.

In the foregoing, a non-limiting example has been described in which the two player objects OBJ each move along the circular path L, and a portion thereof moves in a direction away from the circular path L. Alternatively, the player objects OBJ may perform an action in another form. In a first non-limiting example, a player object OBJ may be deformed so that the player object OBJ thrusts in a direction away from the circular path L, so that a portion of the deformed player object OBJ is shifted in a direction away from the circular path L. In a second non-limiting example, a player object OBJ may be in the shape of a circular ring disposed on the entire circular path L. In that case, the circular ring-shaped player object OBJ may perform an action of turning on the circular path L according to a roll operation performed on the ring-shaped extension apparatus 5, and a portion of that player object OBJ may be deformed to thrust in a direction away from the circular path L according to a deformation operation performed on the ring-shaped extension apparatus 5. In a third non-limiting example, a scene that a player object OBJ attacks in a direction away from the circular path L (e.g., a scene that a beam for eliminating a target object T is fired) may be displayed according to according to a deformation operation performed on the ring-shaped extension apparatus 5. In that case, a scene that a player object OBJ attacks in an outward direction away from the circular path L is displayed according to a pulling operation of deforming the ring-shaped extension apparatus 5 so that the grip covers 203 and 204 move away from each other, and a scene that a player object OBJ attacks in an inward direction away from the circular path L is displayed according to a pressing operation of deforming the ring-shaped extension apparatus 5 so that the grip covers 203 and 204 move toward each other.

The velocity or attack strength at which at least a portion of a player object OBJ moves in a direction away from the circular path L may be invariable, or may vary depending on a deformation operation performed on the ring-shaped extension apparatus 5. In the latter case, the movement velocity or attack power of a player object OBJ may vary depending on the magnitude of the amount, velocity, acceleration, or the like of deformation of the ring-shaped extension apparatus 5 caused by a deformation operation performed thereon.

In the foregoing, a non-limiting example has been described in which the path along which a player object OBJ moves according to a roll operation performed on the ring-shaped extension apparatus 5 is circular (the circular path L). Alternatively, the path may be a straight line (line segment) path extending in a lateral direction, a straight line (line segment) path extending in a vertical direction, an arc-shaped path, an elliptical path, an oval path, or a polygonal path. For example, in the case where a player object OBJ moves along a straight line (line segment) path, the player object OBJ may be moved according to a yaw or pitch operation performed on the ring-shaped extension apparatus 5.

In the foregoing, an appearance location H where a target object T appears is previously determined. Alternatively, a target object T may appear at any suitable location. For example, a target object T may appear at any suitable location on an inner circular wall provided inside the circular path L and at any suitable location on an outer circular wall provided outside the circular path L.

One or three or more player objects OBJ may be provided and caused to perform an action according to an operation performed on the ring-shaped extension apparatus 5. One or three or more holding portions may be provided on the ring-shaped extension apparatus 5.

Other games may be played using an operation of moving the ring-shaped extension apparatus 5 and an operation of deforming the ring-shaped extension apparatus 5. For example, a game may be played in which an attack is performed in a direction in the virtual game space corresponding to the circular-ring axis direction of the ring-shaped extension apparatus 5. In that case, by changing the orientation of the ring-shaped extension apparatus 5 in a yaw or pitch direction, the user can perform an operation of changing the attack direction in the virtual game space corresponding to the circular-ring axis direction of the ring-shaped extension apparatus 5, and the attack direction is represented by changing the orientation or location of a virtual object (e.g., the ring object R of FIG. 12) in the virtual game space corresponding to the ring-shaped extension apparatus 5. Alternatively, by performing a pulling operation of deforming the ring-shaped extension apparatus 5 so that the grip covers 203 and 204 move away from each other, an operation of loading an object (an attack object formed of a solid, liquid, gas, electricity, power, or the like) that is to be fired in the attack direction can be performed, and by performing a pressing operation of deforming the ring-shaped extension apparatus 5 so that the grip covers 203 and 204 move toward each other, an operation of firing the loaded object in the attack direction from the virtual object to attack can be performed. Note that in the above non-limiting examples, the virtual object corresponding to the ring-shaped extension apparatus 5 corresponds to another non-limiting example of the first object, and a scene that an attack is launched in the attack direction corresponds to another non-limiting example of a predetermined action of the first object.

Figure 17:
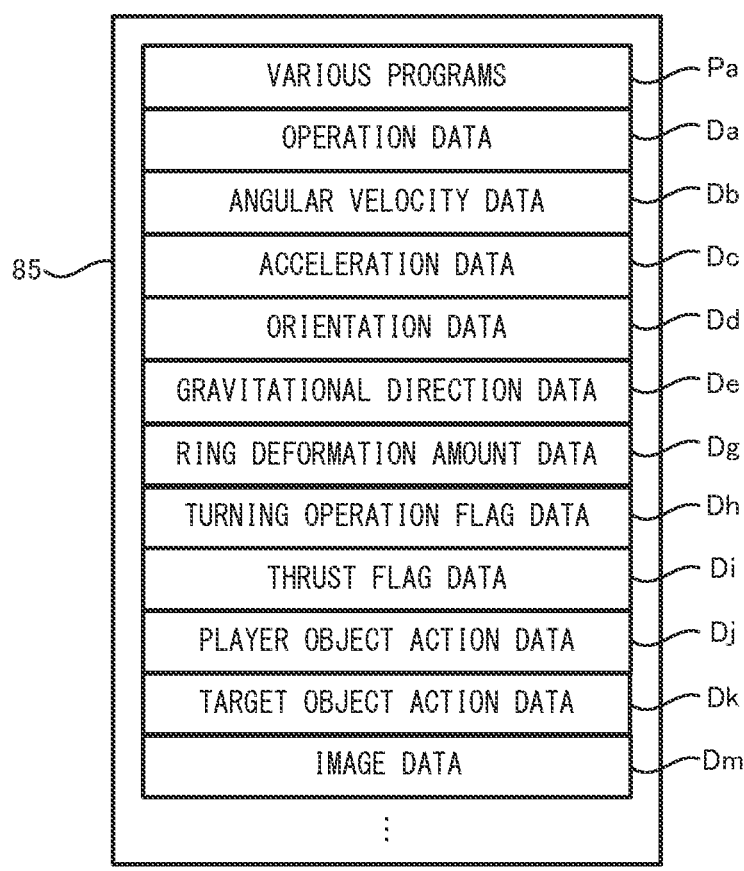
FIG. 17 is a diagram showing a non-limiting example of a data area contained in a DRAM 85 of the main body apparatus 2.

Next, a non-limiting example of a specific process executed in the game system 1 in this non-limiting example will be described with reference to FIGS. 17-20. FIG. 17 is a diagram showing a non-limiting example of a data area contained in the DRAM 85 of the main body apparatus 2 in this non-limiting example. Note that in addition to the data of FIG. 17, the DRAM 85 also stores data used in other processes, which will not be described in detail.

Various programs Pa that are executed in the game system 1 are stored in a program storage area of the DRAM 85. In this non-limiting example, the programs Pa include a communication program for performing wireless communication with the right controller 4, an application program (e.g., a game program) for performing information processing based on data obtained from the right controller 4 or the orientation of the main body apparatus 2. Note that the programs Pa may be previously stored in the flash memory 84, may be obtained from a storage medium removably attached to the game system 1 (e.g., a predetermined type of storage medium inserted in the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as a communication process and an information process that are executed in the game system 1 are stored in a data storage area of the DRAM 85. In this non-limiting example, the DRAM 85 stores operation data Da, angular velocity data Db, acceleration data Dc, orientation data Dd, gravitational direction data De, ring deformation amount data Dg, turning operation flag data Dh, thrust flag data Di, player object action data Dj, target object action data Dk, and image data Dm, etc.

The operation data Da is obtained from the right controller 4 as appropriate. As described above, the operation data transmitted from the right controller 4 includes information about an input from each input section (specifically, each button, an analog stick, or each sensor) (specifically, information about an operation, and the result of detection by each sensor), and a strain value indicating a state of deformation of the ring-shaped portion 201 of the ring-shaped extension apparatus 5. In this non-limiting example, operation data is transmitted from the right controller 4 at predetermined time intervals through wireless communication. The received operation data is used to update the operation data Da as appropriate. Note that the operation data Da may be updated for each frame that is the cycle of a process executed in the game system 1, or may be updated each time operation data is received through the wireless communication.

The angular velocity data Db indicates the history of angular velocities occurring on the right controller 4 that have been obtained during a period of time from the current time to a predetermined time before. The angular velocities are included in the operation data obtained from the right controller 4. For example, the angular velocity data Db includes the history of data indicating angular velocities about the x-, y-, and z-axes occurring on the right controller 4, etc.

The acceleration data Dc indicates the history of accelerations occurring on the right controller 4 that have been obtained during a period of time from the current time to a predetermined time before. The accelerations are included in the operation data obtained from the right controller 4. For example, the acceleration data Dc includes the history of data indicating accelerations in the x-, y-, and z-axis directions occurring on the right controller 4, etc.

The orientation data Dd indicates an orientation of the right controller 4 in the real space. In a non-limiting example, the orientation data Dd indicates the x-, y-, and z-axis directions (e.g., angles with respect to X, Y, and Z axes in the real space) of the right controller 4 in the real space.

The gravitational direction data De indicates the direction of an gravitational acceleration acting on the right controller 4.

The ring deformation amount data Dg indicates the direction and amount of deformation of the ring-shaped extension apparatus 5.

The turning operation flag data Dh indicates a turning operation flag that is set "on" when an operation (roll operation) of turning the ring-shaped extension apparatus 5 is being performed. The thrust flag data Di indicates a thrust flag that is set "on" when the player object OBJ is ready to move in a direction away from the circular path L.

The player object action data Dj indicates the location, state, orientation, action, etc., of a player object OBJ disposed in the virtual game space. The target object action data Dk indicates the location, state, orientation, action, etc., of a target object T.

The image data Dm is for displaying an image (e.g., an image of a player object OBJ, an image of a target object T, a field image including an appearance location H, a background image, etc.) on a display screen.

Figure 18:
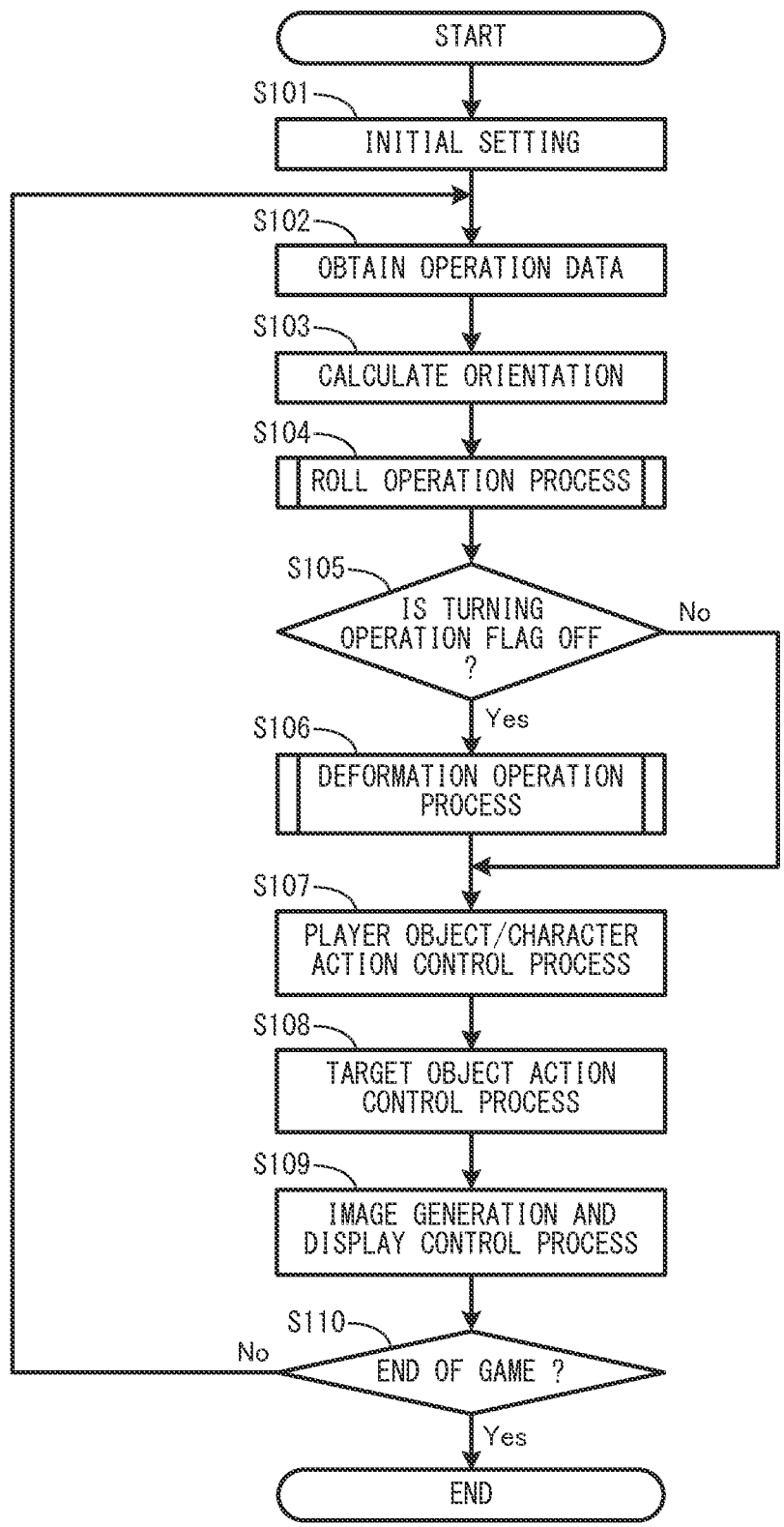
FIG. 18 is a flowchart showing a non-limiting example of an information process that is executed by the game system 1.
Figure 19:
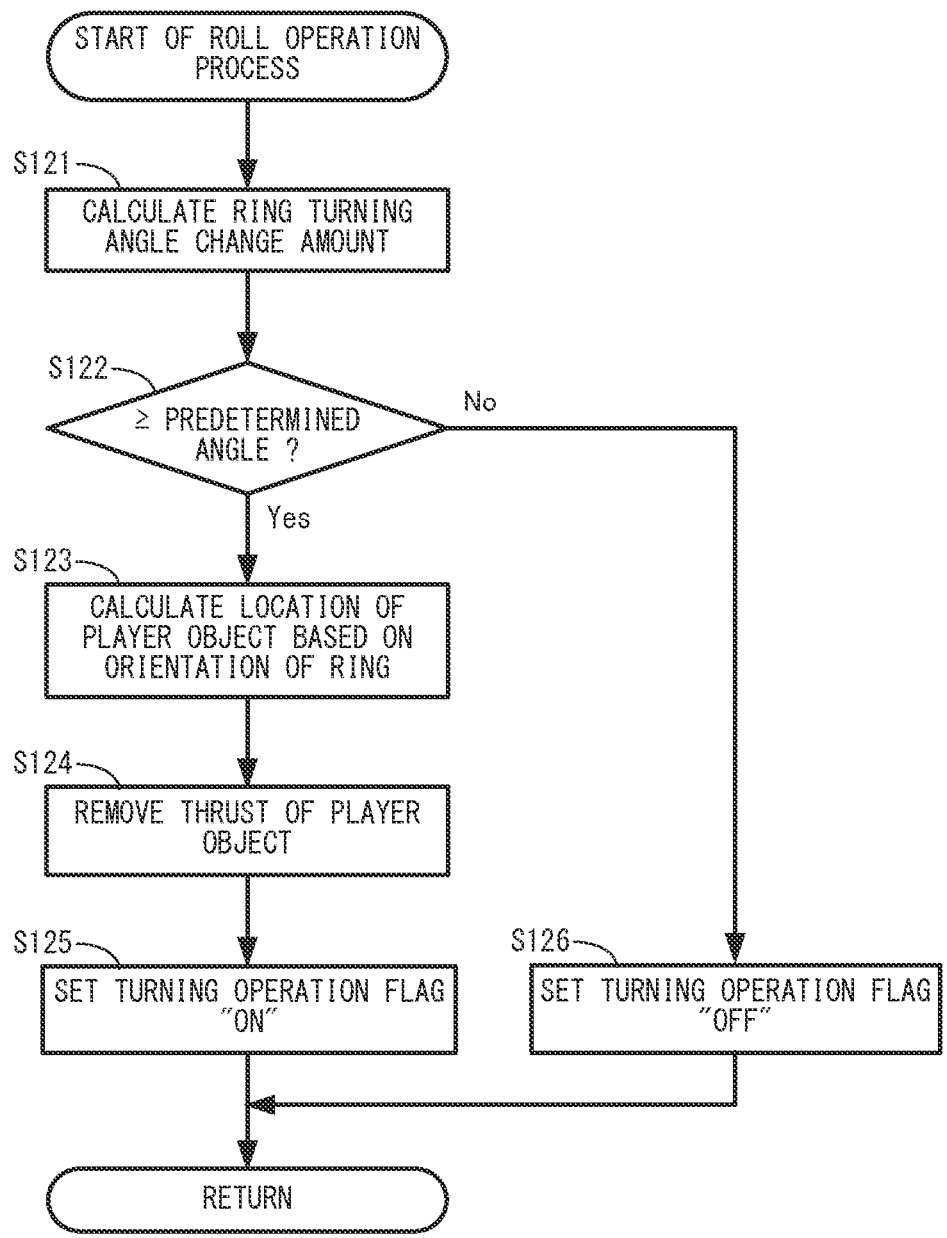
FIG. 19 is a subroutine showing a specific non-limiting example of a roll operation process that is performed in step S104 shown in FIG. 18.
Figure 20:
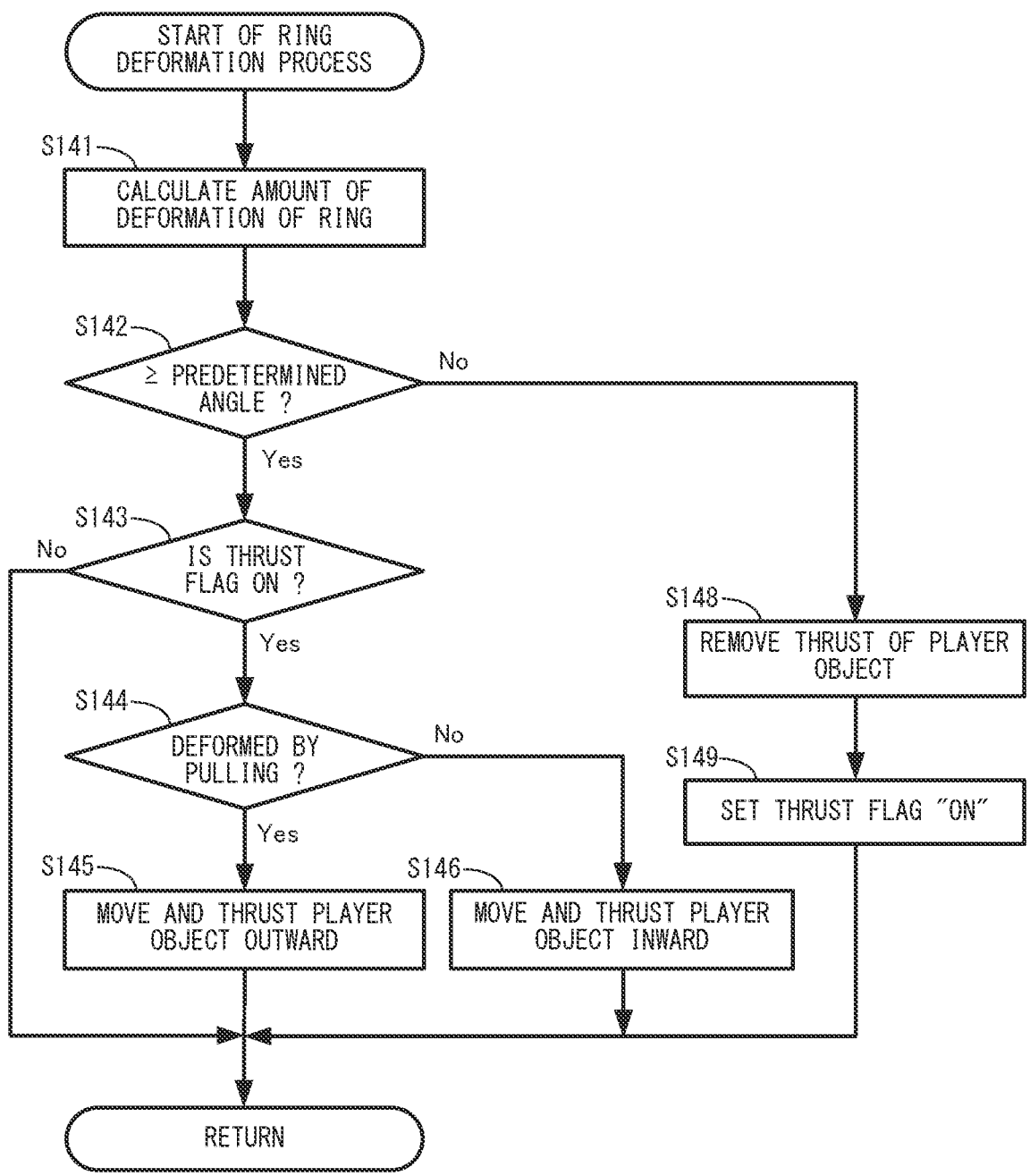
FIG. 20 is a subroutine of a specific non-limiting example of a deformation operation process that is performed in step S106 shown in FIG. 18.

Next, a specific non-limiting example of an information process in this non-limiting example will be described with reference to FIGS. 18-20. FIG. 18 is a flowchart showing a non-limiting example of an information process that is executed by the game system 1. FIG. 19 is a subroutine showing a specific non-limiting example of a roll operation process that is performed in step S104 shown in FIG. 18. FIG. 20 is a subroutine of a specific non-limiting example of a deformation operation process that is performed in step S106 shown in FIG. 18. In this non-limiting example, a series of processes shown in FIGS. 18-20 are performed by the processor 81 executing a communication program and a predetermined application program (game program) included in the programs Pa. The information process of FIGS. 18-20 is started with any suitable timing.

Note that the steps in the flowchart of FIGS. 18-20, which are merely illustrative, may be executed in a different order, or another step may be executed in addition to (or instead of) each step, if a similar effect is obtained. In this non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 18-20 may be executed by a plurality of information processing apparatuses including the main body apparatus 2 cooperating with each other.

In FIG. 18, the processor 81 performs initial setting for the information process (step S101), and proceeds to the next step. For example, in the initial setting, the processor 81 initializes parameters for performing processes to be described below. For example, the processor 81 initially disposes, in the virtual game space, objects (including player objects OBJ) to generate an initial state of the virtual game space, and updates the player object action data Dj with the locations, directions, and orientations, etc., of the player objects OBJ.

Next, the processor 81 obtains operation data from the right controller 4 and updates the operation data Da (step S102), and proceeds to the next step. Note that the processor 81 stores data indicating an angular velocity occurring on the right controller 4, which is included in the operation data obtained from the right controller 4 in step S102, into the angular velocity data Db. The processor 81 also stores data indicating an acceleration occurring on the right controller 4, which is included in the operation data obtained from the right controller 4 in step S102, into the acceleration data Dc.

Next, the processor 81 calculates the orientation of the right controller 4 (step S103), and proceeds to the next step. For example, the processor 81 obtains the angular velocities about the x-, y-, and z-axes of the right controller 4 using angular velocity data stored in the angular velocity data Db. Thereafter, the processor 81 turns the x-, y-, and z-axes with reference to the gravitational acceleration direction of the orientation of the right controller 4 indicated by the orientation data Dd, based on the respective angular velocities obtained, and updates data indicating the orientation of the right controller 4 in the orientation data Dd using the directions of the turned x-, y-, and z-axes with reference to the gravitational acceleration direction. The processor 81 also calculates the direction of the gravitational acceleration acting on the right controller 4 using acceleration data stored in the acceleration data Dc, and updates the gravitational direction data De. Note that the gravitational acceleration may be extracted using any suitable technique. For example, an acceleration component averagely occurring on the right controller 4 may be calculated and extracted as the gravitational acceleration. The processor 81 also corrects, as appropriate, the orientation of the right controller 4 indicated by the orientation data Dd using the direction of the gravitational acceleration occurring on the right controller 4 indicated by the gravitational direction data De.

Next, the processor 81 performs a roll operation process (step S104), and proceeds to step S105. The roll operation process performed in step S104 will now be described with reference to FIG. 19.

In FIG. 19, the processor 81 calculates angles (ring rotational angle change amount) by which a roll operation has been performed on the ring-shaped extension apparatus 5 during a period of time from a predetermined time before to the current time (step S121), and proceeds to the next step. For example, the processor 81 calculates changes in the orientation of the right controller 4 that have occurred during a period of time from a predetermined time before to the current time using the angular velocity data Db, the acceleration data Dc, the orientation data Dd, and the gravitational direction data De, etc., and based on the orientation changes, calculates an angle change amount by which a roll operation has been performed on the ring-shaped extension apparatus 5.

Next, the processor 81 determines whether or not the ring rotational angle change amount calculated in step S121 is greater than or equal to a predetermined angle (step S122). If the ring rotational angle change amount is greater than or equal to the predetermined angle, the processor 81 determines that a roll operation has been performed, and proceeds to step S123. Otherwise, i.e., if the ring rotational angle change amount is smaller than the predetermined angle, the processor 81 determines that a roll operation has not been performed, and proceeds to step S126.

In step S123, the processor 81 calculates the locations of the player objects OBJ based on the orientation of the ring-shaped extension apparatus 5, and proceeds to the next step. For example, the processor 81 calculates the orientation (e.g., the angle θ between the gravitational acceleration g and the straight line Dh connecting the grip covers 203 and 204; see FIG. 13) of the ring-shaped extension apparatus 5 in the real space using the orientation of the right controller 4 indicated by the orientation data Dd, and changes and sets the locations of the player objects OBJ based on the orientation of the ring-shaped extension apparatus 5 to update the player object action data Dj.

Next, the processor 81 removes a movement state in which the player objects OBJ is thrusting in a direction away from the circular path L (step S124), and proceeds to the next step. For example, when the inner player objects OBJ1i and OBJ2i of the player objects OBJ, which are provided inside the circular path L, are disposed inside away from the circular path L, the processor 81 moves the inner player objects OBJ1i and OBJ2i to the circular path L and thereby returns the inner player objects OBJ1i and OBJ2i to a state that occurred before the movement to the inside. As a result, the processor 81 removes the movement state in which the inner player objects OBJ1i and OBJ2i are thrusting in a direction away from the circular path L, and updates the player object action data Dj with the locations after the removal. When the outer player objects OBJ1o and OBJ2o of the player objects OBJ, which are provided outside the circular path L, are disposed outside away from the circular path L, the processor 81 moves the outer player objects OBJ1o and OBJ2o to the circular path L and thereby returns the outer player objects OBJ1o and OBJ2o to a state that occurred before the movement to the outside. As a result, the processor 81 removes the movement state in which the outer player objects OBJ1o and OBJ2o are thrusting in a direction away from the circular path L, and updates the player object action data Dj with the locations after the removal.

Next, the processor 81 sets the turning operation flag "on" (step S125), and ends the process of the subroutine. For example, the processor 81 sets "on" the turning operation flag indicated by the turning operation flag data Dh, and updates the turning operation flag data Dh.

Otherwise, i.e., if the ring rotational angle change amount is smaller than the predetermined angle, the processor 81 sets the turning operation flag "off" (step S126), and ends the process of the subroutine. For example, the processor 81 sets "off" the turning operation flag indicated by the turning operation flag data Dh, and updates the turning operation flag data Dh.

Referring back to FIG. 18, the processor 81 determines whether or not the turning operation flag is off after the roll operation process performed in step S104 (step S105). For example, if the turning operation flag indicated by the turning operation flag data Dh is off, the result of determination in step S105 by the processor 81 is positive. If the turning operation flag is off, the processor 81 proceeds to step S106. Otherwise, i.e., if the turning operation flag is on, the processor 81 proceeds to step S107.

In step S106, the processor 81 performs a deformation operation process, and proceeds to step S107. The deformation operation process performed in step S106 will be described with reference to FIG. 20.

In FIG. 20, the processor 81 calculates the amount of deformation of the ring-shaped extension apparatus 5 (step S141), and proceeds to the next step. For example, the processor 81 calculates the amount and direction of deformation of the ring-shaped portion 201 of the ring-shaped extension apparatus 5 using a strain value indicated by the operation data Da, and updates the ring deformation amount data Dg with the calculation result.

Next, the processor 81 determines whether or not the amount of deformation calculated in step S141 is greater than or equal to a predetermined amount (step S142). If the amount of deformation is greater than or equal to the predetermined amount, the processor 81 proceeds to step S143. Otherwise, i.e., if the amount of deformation is smaller than the predetermined amount, the processor 81 proceeds to step S148.

In step S143, the processor 81 determines whether or not the thrust flag is on. For example, if the thrust flag indicated by the thrust flag data Di is on, the result of determination in step S143 by the processor 81 is positive. If the thrust flag is on, the processor 81 proceeds to step S144. Otherwise, i.e., if the thrust flag is off, the processor 81 ends the process of the subroutine.

In step S144, the processor 81 determines whether or not the ring-shaped extension apparatus 5 is in a deformed state caused by a pulling operation. For example, if the processor 81 determines, based on the deformation direction calculated in step S141, that the ring-shaped extension apparatus 5 is deformed so that the grip covers 203 and 204 of the ring-shaped extension apparatus 5 move in a direction away from each other, the result of determination in step S144 by the processor 81 is positive. If the processor 81 determines, based on the deformation direction calculated in step S141, that the ring-shaped extension apparatus 5 is deformed so that the grip covers 203 and 204 of the ring-shaped extension apparatus 5 move toward each other, the result of determination in step S144 by the processor 81 is negative. If the ring-shaped extension apparatus 5 is in a deformed state caused by a pulling operation, the processor 81 proceeds to step S145. Otherwise, i.e., if the ring-shaped extension apparatus 5 is not in a deformed state caused by a pulling operation, i.e., is in a deformed state caused by a pressing operation, the processor 81 proceeds to step S146.

In step S145, the processor 81 moves the player objects OBJ so that the player objects OBJ thrust in an outward direction away from the circular path L, and ends the process of the subroutine. For example, the processor 81 moves each of the outer player objects OBJ1o and OBJ2o of the player objects OBJ, which are provided outside the circular path L, in an outward direction away from the circular path L, and updates the player object action data Dj with the locations after the movement. Note that when the outer player objects OBJ1o and OBJ2o are in contact with an object (e.g., an outer wall including appearance locations Ho) other than target objects TO, the processor 81 stops the movement in the outward direction away from the circular path L, and sets the thrust flag "off" to update the thrust flag data Di.

Meanwhile, in step S146, the processor 81 moves the player objects OBJ so that the player objects OBJ thrust in an inward direction away from the circular path L, and ends the process of the subroutine. For example, the processor 81 moves each of the inner player objects OBJ1i and OBJ2i of the player object OBJ, which are provided inside the circular path L, in an inward direction away from the circular path L, and updates the player object action data Dj with the location after the movement. Note that when the inner player objects OBJ1i and OBJ2i are in contact with an object (e.g., an inner wall including appearance locations Hi) other than target objects TI, the processor 81 stops the movement in the inward direction away from the circular path L, and sets the thrust flag "off" to update the thrust flag data Di.

Meanwhile, if the amount of deformation calculated in step S141 is smaller than the predetermined amount, the processor 81 removes the movement state in which the player objects OBJ are thrusting in a direction away from the circular path L (step S148), and proceeds to the next step. Note that step S148 is similar to step S124 and will not be described in detail.

Next, the processor 81 sets the thrust flag "on" (step S149), and ends the process of the subroutine. For example, the processor 81 sets "on" the thrust flag indicated by the thrust flag data Di to update the thrust flag data Di.

Referring back to FIG. 18, in step S107, the processor 81 performs an action control process on the player objects OBJ and the player character PC, and proceeds to the next step. For example, the processor 81 disposes the player objects OBJ in the virtual game space based on the locations, states, orientations, actions, etc., of the player objects OBJ indicated by the player object action data Dj. The processor 81 also sets a turning orientation of the ring object R held by the player character PC with both hands in the virtual game space, based on the orientation of the right controller 4 indicated by the orientation data Dd, and changes the pose of the player character PC and the location of the ring object R, based on the set turning orientation, so that the ring object R turns around the circular-ring axis. The processor 81 also deforms the ring object R and changes the pose of the player character PC, based on the ring deformation amount data Dg.

Next, the processor 81 performs an action control process on a target object T (step S108), and proceeds to the next step. For example, in the case where target objects TI and/or TO are caused to appear from at least one of a plurality of appearance locations Hi and Ho according to a predetermined algorithm (appearance pattern), the processor 81 sets an action of displaying a scene of the appearance, and updates the target object action data Dk with the location after the appearance. In the case where an appearing target object TI or TO is hit by the player objects OBJ and disappears, the processor 81 sets an action of displaying a scene of the disappearance and addition of game points, and causes the target object TI or TO to disappear from the virtual game space, and updates the target object action data Dk. In the case where target objects TI and/or TO appearing from a plurality of appearance locations Hi and Ho are caused to retreat according to a predetermined algorithm (appearance pattern), the processor 81 sets an action of displaying a scene of the retreat, and causes the target objects TI and/or TO to disappear from the virtual game space, and updates the target object action data Dk.

Next, the processor 81 performs an image generation and display control process (step S109), and proceeds to the next step. For example, the processor 81 disposes a plurality of objects (the player objects OBJ, the player character PC, the ring object R, a target object T, etc.) in the virtual game space based on the settings provided by steps S107 and S108, to generate the virtual game space. The processor 81 also disposes a virtual camera in the virtual game space, generates an image of the virtual game space as viewed from the virtual camera, and outputs the virtual game space image to the stationary monitor 9.

Next, the processor 81 determines whether or not to end the game process (step S110). In step S110, a condition for ending the game process is, for example, that a condition for ending the game process is satisfied, that the user has performed an operation of ending the game process, etc. If the processor 81 determines not to end the game process, the processor 81 returns to step S102, and repeats the process. Otherwise, i.e., if the processor 81 determines to end the game process, the processor 81 ends the process of the flowchart. Thereafter, steps S102-S110 are repeatedly executed until the processor 81 determines to end the game process in step S110.

Thus, in this non-limiting example, a player object OBJ can be caused to perform different actions according to an operation of moving the ring-shaped extension apparatus 5 and an operation of deforming the ring-shaped extension apparatus 5, and therefore, the user's bodily sensation can be improved by operations performed on the ring-shaped extension apparatus 5. In addition, different action controls can be performed on a player object OBJ using different operations performed on the ring-shaped extension apparatus 5, and therefore, the number of kinds of actions carried out by a player object OBJ can be increased.

In the above non-limiting examples, the ring-shaped extension apparatus 5 includes the ring-shaped portion 201 made of an elastically deformable material, and a process is performed according to an operation of elastically deforming the ring-shaped portion 201. By thus allowing an operation of causing a main portion of an input apparatus to undergo elastic deformation, the following effects can be expected: the user can easily continuously perform a pressing operation and a pulling operation; the pressing operation and pulling operation involving elastic deformation improves the user's feeling of operation; the pressing operation and pulling operation involving elastic deformation allows the user to easily bodily sense the motion of the player object OBJ; the requirement of a pressing operation and a pulling operation motivates the user to perform a physical exercise (e.g., an exercise of moving the arms); etc.

Note that in the above non-limiting examples, the main body apparatus 2 and the right controller 4 wirelessly communicate with each other so that the operation data of the right controller 4 is transmitted to the main body apparatus 2. The operation data may be transmitted to the main body apparatus 2 in other ways. For example, the operation data of the right controller 4 may be transmitted to the left controller 3, and thereafter, both of the operation data (or processed operation data) of the right controller 4 and the operation data (or processed operation data) of the left controller 3 may be transmitted together from the left controller 3 to the main body apparatus 2.

In the above non-limiting examples, the methods for detecting the orientation and motion of the right controller 4 (the orientation and motion of the ring-shaped extension apparatus 5) are merely illustrative, and the orientation and motion may be detected using other methods and other data. The above acceleration sensor and/or angular velocity sensor are a non-limiting example of a sensor that outputs data for calculating the orientation and motion of the right controller 4. For example, in another non-limiting example, the right controller 4 may include a magnetic sensor instead of or in addition to the acceleration sensor and/or angular velocity sensor, and a magnetism detected by the magnetic sensor may be used to calculate the orientation and motion of the right controller 4. The methods for calculating the orientation and motion of the right controller 4 are not particularly limited. For example, in another non-limiting example, the main body apparatus 2 may capture an image of the right controller 4 (the ring-shaped extension apparatus 5) using an imaging device, and may use the captured image to calculate the orientation of the right controller 4 (the ring-shaped extension apparatus 5). Alternatively, data detected by an acceleration sensor and/or angular velocity sensor included in the right controller 4 may be used in the right controller 4 to calculate the orientation and motion of the right controller 4. In that case, operation data additionally including the data calculated in the right controller 4 and indicating the orientation and motion of the right controller 4 is transmitted from the right controller 4 to the main body apparatus 2.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of moving an object may be, instead of the left controller 3 or the right controller 4, another controller, mouse, touchpad, touch panel, trackball, keyboard, directional pad, slidepad, etc.

In the above non-limiting examples, the ring-shaped extension apparatus 5, when the right controller 4 is attached thereto, functions as an input apparatus equipped with an inertial sensor (e.g., an acceleration sensor or an angular velocity sensor). This function may be implemented in other ways. For example, the ring-shaped extension apparatus 5 itself has the inertial sensor function. In a non-limiting example, the main portion 202 may include an acceleration sensor for detecting an acceleration along the direction of at least one axis occurring on the ring-shaped extension apparatus 5 and/or an angular velocity sensor for detecting an angular velocity about at least one axis occurring on the ring-shaped extension apparatus 5.

In the above non-limiting examples, all the process steps are performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting examples, the information process can be performed by the processor 81 of the game system 1 executing a predetermined program. Alternatively, all or a portion of the above process may be performed by a dedicated circuit included in the game system 1.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement this non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

As described above, this non-limiting example is applicable as an information processing system, information processing program, information processing apparatus, and information processing method, etc., that can improve a user's bodily sensation.

What is claimed is:

1. An information processing system comprising: an input apparatus including a first and a second sensor; and an information processing apparatus, wherein:

the input apparatus is at least partially elastically deformable in response to an external force applied thereto,
the first sensor is configured to produce an output corresponding to deformation of the input apparatus,
the second sensor is configured to produce an output corresponding to a motion and/or orientation of the input apparatus,
the information processing apparatus includes at least one processor configured to control the information processing apparatus to at least:
  obtain, from the input apparatus, first data based on the output of the first sensor and second data based on the output of the second sensor, and
  execute a game process, and
the executing of the game process includes:
  moving a first object in a virtual space or changing an orientation of the first object in the virtual space, based on the second data,
  causing the first object to perform an action in the virtual space, based on the first data,
  causing the second object to appear from each of an appearance location set in a first area in the virtual space and an appearance location set in a second area in the virtual space different from the first area, wherein the first area is set on one of opposite sides of a movement path of the first object, and the second area is set on the other of the opposite sides of the movement path of the first object, and
  executing a process based on a positional relationship between the first and second objects as a result of the action of the first object.

2. The information processing system according to claim 1, wherein the first sensor is configured to produce an output corresponding to detection of deformation of the first sensor itself or an output corresponding to a pressure applied to the first sensor itself.

3. The information processing system according to claim 1, wherein the first sensor is a strain sensor.

4. An information processing apparatus for performing a process using an output of an input apparatus including a first and a second sensor, wherein:

the input apparatus is at least partially elastically deformable in response to an external force applied thereto,
the first sensor is configured to produce an output corresponding to deformation of the input apparatus,
the second sensor is configured to produce an output corresponding to a motion and/or orientation of the input apparatus,
the information processing apparatus includes at least one processor configured to control the information processing apparatus to at least:
  obtain, from the input apparatus, first data based on the output of the first sensor and second data based on the output of the second sensor, and
  execute a game process, and
the executing of the game process includes:
  moving a first object in a virtual space or changing an orientation of the first object in the virtual space, based on the second data,
  causing the first object to perform an action in the virtual space, based on the first data,
  causing the second object to appear from each of an appearance location set in a first area in the virtual space and an appearance location set in a second area in the virtual space different from the first area, wherein the first area is set on one of opposite sides of a movement path of the first object, and the second area is set on the other of the opposite sides of the movement path of the first object, and executing a process based on a positional relationship between the first and second objects as a result of the action of the first object.

5. An information processing system comprising: an input apparatus that is in the shape of a ring and is at least partially elastically deformable; and an information processing apparatus, wherein:
the input apparatus includes:
a first sensor configured to produce an output corresponding to deformation of the input apparatus, and
a second sensor configured to produce an output corresponding to a motion and/or orientation of the input apparatus,
the information processing apparatus includes at least one processor configured to control the information processing apparatus to at least process input data, and execute a game process,
the processing of the input data includes obtaining, from the input apparatus, first data based on the output of the first sensor and second data based on the output of the second sensor, and
the executing of the game process includes:
moving a first object in a first direction from a position set based on the second data in a virtual space when the first data indicates that the input apparatus is deformed such that two points on the ring of the input apparatus are moved toward each other, and
moving the first object or a second object different from the first object in a second direction different from the first direction from the position set based on the second data in the virtual space when the first data indicates that the input apparatus is deformed such that the two points on the ring of the input apparatus are moved away from each other.

6. The information processing system according to claim 5, wherein the first sensor is configured to produce an output corresponding to detection of deformation of the first sensor itself or an output corresponding to a pressure applied to the first sensor itself.

7. The information processing system according to claim 5, wherein the first sensor is a strain sensor.

8. An information processing apparatus for performing a process using an output of an input apparatus that is in the shape of a ring and is at least partially elastically deformable, wherein:
the input apparatus includes:
a first sensor configured to produce an output corresponding to deformation of the input apparatus, and
a second sensor configured to produce an output corresponding to a motion and/or orientation of the input apparatus,
the information processing apparatus includes at least one processor configured to control the information processing apparatus to at least process input data, and execute a game process,
the processing of the input data includes obtaining, from the input apparatus, first data based on the output of the first sensor and second data based on the output of the second sensor, and
the executing of the game process includes:
moving a first object in a first direction from a position set based on the second data in a virtual space when the first data indicates that the input apparatus is deformed such that two points on the ring of the input apparatus are moved toward each other, and
moving the first object or a second object different from the first object in a second direction different from the first direction from the position set based on the second data in the virtual space when the first data indicates that the input apparatus is deformed such that the two points on the ring of the input apparatus are moved away from each other.

9. An information processing system comprising: an input apparatus including a first and a second sensor; and an information processing apparatus, wherein:
the input apparatus is at least partially elastically deformable in response to an external force applied thereto,
the first sensor is configured to produce an output corresponding to deformation of the input apparatus,
the second sensor is configured to produce an output corresponding to a motion and/or orientation of the input apparatus,
the information processing apparatus includes at least one processor configured to control the information processing apparatus to at least:
obtain, from the input apparatus, first data based on the output of the first sensor and second data based on the output of the second sensor, and
execute a game process, and
the executing of the game process includes:
moving a first object in a virtual space or changing an orientation of the first object in the virtual space, based on the second data,
calculating an orientation of the input apparatus in a real space, based on the second data,
moving the first object along a movement path set in the virtual space, based on the orientation of the input apparatus, and
causing the first object to move in a first direction away from the movement path when the first data indicates that the input apparatus is deformed in a first form, and causing the first object to move in a second direction away from the movement path when the first data indicates that the input apparatus is deformed in a second form, the second direction being different from the first direction.

10. The information processing system according to claim 9, wherein:
the executing of the game process further includes controlling a second object in the virtual space, and
the first object is caused to either affect or not affect the second object, based on a positional relationship between the first and second objects in the virtual space.

11. The information processing system according to claim 10, wherein the controlling of the second object further includes causing the second object to appear at one or more of a plurality of appearance locations set in the virtual space, according to an elapsed time, and causing the second object appearing from the appearance location to disappear, according to an elapsed time.

12. The information processing system according to claim 10, wherein the controlling of the second object further includes causing the second object to appear from each of an appearance location set in a first area in the virtual space and an appearance location set in a second area in the virtual space different from the first area.

13. The information processing system according to claim 9, wherein the first sensor is configured to produce an output corresponding to detection of deformation of the first sensor itself or an output corresponding to a pressure applied to the first sensor itself.

14. The information processing system according to claim 9, wherein the first sensor is a strain sensor.

15. An information processing apparatus for performing a process using an output of an input apparatus including a first and a second sensor, wherein:
- the input apparatus is at least partially elastically deformable in response to an external force applied thereto,
- the first sensor is configured to produce an output corresponding to deformation of the input apparatus,
- the second sensor is configured to produce an output corresponding to a motion and/or orientation of the input apparatus,
- the information processing apparatus includes at least one processor configured to control the information processing apparatus to at least:
  - obtain, from the input apparatus, first data based on the output of the first sensor and second data based on the output of the second sensor, and
  - execute a game process, and
- the executing of the game process includes:
  - moving a first object in a virtual space or changing an orientation of the first object in the virtual space, based on the second data, and
  - calculating an orientation of the input apparatus in a real space, based on the second data,
  - moving the first object along a movement path set in the virtual space, based on the orientation of the input apparatus,
  - causing the first object to move in a first direction away from the movement path when the first data indicates that the input apparatus is deformed in a first form, and causing the first object to move in a second direction away from the movement path when the first data indicates that the input apparatus is deformed in a second form, the second direction being different from the first direction.

16. The information processing apparatus according to claim 15, wherein:
- the executing of the game process further includes controlling a second object in the virtual space, and
- the first object is caused to either affect or not affect the second object, based on a positional relationship between the first and second objects in the virtual space.

17. The information processing apparatus according to claim 16, wherein the controlling of the second object further includes causing the second object to appear at one or more of a plurality of appearance locations set in the virtual space, according to an elapsed time, and causing the second object appearing from the appearance location to disappear, according to an elapsed time.

18. The information processing apparatus according to claim 16, wherein the controlling of the second object further includes causing the second object to appear from each of an appearance location set in a first area in the virtual space and an appearance location set in a second area in the virtual space different from the first area.

19. The information processing apparatus according to claim 15, wherein the first sensor is configured to produce an output corresponding to detection of deformation of the first sensor itself or an output corresponding to a pressure applied to the first sensor itself.

20. The information processing apparatus according to claim 15, wherein the first sensor is a strain sensor.

* * * * *